(12) United States Patent
Yamazaki et al.

(10) Patent No.: US 6,401,004 B1
(45) Date of Patent: Jun. 4, 2002

(54) METHOD AND DEVICE FOR ANALYZING NC PROGRAM FOR NC MACHINING

(75) Inventors: Kazuo Yamazaki, 44204 Greenview Dr., El Macero, CA (US) 95618; Naoki Morita, Yamatokoriyama (JP); Sadayuki Matsumiya, Kawasaki (JP); Yasushi Fukaya, Niwa-gun (JP)

(73) Assignees: Kabushiki Kaisha Mori Seiki Seisakusho, Yamatokoriyama; Mitutoyo Corporation, Kawasaki; Okuma Corporation, Nagoya, all of (JP); Kazuo Yamazaki, El Macero, CA (US)

( * ) Notice: Subject to any disclaimer, the term of this patent is extended or adjusted under 35 U.S.C. 154(b) by 0 days.

(21) Appl. No.: 09/101,198

(22) PCT Filed: Nov. 7, 1996

(86) PCT No.: PCT/JP96/03264

§ 371 (c)(1),
(2), (4) Date: Jul. 2, 1998

(87) PCT Pub. No.: WO98/19820

PCT Pub. Date: May 14, 1998

(51) Int. Cl.⁷ .............................. G06F 19/00; G06G 7/66
(52) U.S. Cl. ............................ 700/159; 700/83; 700/86; 700/87; 700/163; 700/172; 700/174; 700/175; 700/176; 700/177; 700/179; 700/180; 700/181; 700/182; 700/183; 700/184; 700/185; 700/186; 700/187; 700/188; 700/193; 700/195; 318/568.1; 318/168.24; 318/569; 318/571
(58) Field of Search .............................. 700/159, 174, 700/175, 176, 177, 172, 173, 179, 180, 181, 182, 183, 184, 185, 186, 187, 188, 163, 87, 195, 193, 83, 86; 318/568.1, 568.24, 569, 571

(56) References Cited

U.S. PATENT DOCUMENTS

| | | | | |
|---|---|---|---|---|
| 4,209,847 A | * | 6/1980 | Noda et al. | 700/181 |
| 4,281,379 A | * | 7/1981 | Austin | 700/3 |
| 4,530,046 A | * | 7/1985 | Munekata et al. | 700/86 |
| 4,607,327 A | * | 8/1986 | Kishi et al. | 700/86 |
| 5,255,201 A | * | 10/1993 | Maeda | 700/193 |
| 5,266,876 A | * | 11/1993 | Ito et al. | 318/568.24 |
| 5,270,918 A | * | 12/1993 | Seki et al. | 700/86 |
| 5,283,750 A | * | 2/1994 | Seki et al. | 700/179 |
| 5,428,547 A | * | 6/1995 | Ikeda | 700/174 |
| 5,544,046 A | * | 8/1996 | Niwa | 700/159 |
| 5,552,688 A | * | 9/1996 | Haga | 318/569 |
| 5,723,962 A | * | 3/1998 | Mizukami et al. | 318/571 |
| 5,808,432 A | * | 9/1998 | Inoue et al. | 318/561 |
| 5,815,400 A | * | 9/1998 | Hirai et al. | 700/173 |
| 5,831,407 A | | 11/1998 | Ouchi et al. | |
| 5,919,380 A | * | 7/1999 | Magara et al. | 219/69.16 |
| 6,107,768 A | * | 8/2000 | Ouchi et al. | 318/568.1 |

FOREIGN PATENT DOCUMENTS

JP      A-4-135207      5/1992

\* cited by examiner

*Primary Examiner*—David Wiley
*Assistant Examiner*—Frantz B. Jean
(74) *Attorney, Agent, or Firm*—Oliff & Berridge, PLC

(57) ABSTRACT

A device for analyzing NC program is provided with a machining method analyzing means (34) which extracts machining conditions for every machining work element by analyzing an actual NC machining program, and data base creating means (35). The device extracts necessary machining information from the actual NC machining program and allows the data bases (21, 22, 23 and 24) to reflect the information.

6 Claims, 23 Drawing Sheets

Fig. 4A

SAMPLE NC PROGRAM

| | | | |
|---|---|---|---|
| 1 | O 0001 | 33 | N2(CENTER DRILL) |
| 2 | G90 G80 G40 | 34 | G90 G54 G0 X70. Y50. S1000 M3 T3 |
| 3 | G91 G28 Z0 | 35 | G43 Z50. H2 M8 |
| 4 | T1 | 36 | G99 G81 Z-3. R2. F100 |
| 5 | M6 | 37 | X-70. |
| 6 | N1(FACE MILL 100mm DIA.) | 38 | Y-50. |
| 7 | G90 G54 G0 X160. Y50. S400 M3 T2 | 39 | X70. |
| 8 | G43 Z50. H1 M8 | 40 | X30. Y0 |
| 9 | G1 Z.1 F2000 | 41 | G0 Z100. |
| 10 | X-160. F250 | 42 | G90 G55 G0 X40. Y0. |
| 11 | G0 Y-45. | 43 | Z50. |
| 12 | G1 X160. | 44 | G99 G81 Z-3. R2. F100 |
| 13 | G0 Y50. S600 | 45 | X-40. |
| 14 | G1 Z0 | 46 | G0 Z50. M9 |
| 15 | X-160. F400 | 47 | G91 G28 Z0 M6 |
| 16 | G0 Y-45. | 48 | M1 |
| 17 | G1 X160. | | |
| 18 | G0 Z100. | 49 | N3(DRILL 20mm DIA.) |
| 19 | G55 G0 X160. Y50. S400 | 50 | G90 G54 G0 X70. Y50. S400 M3 T4 |
| 20 | Z50. | 51 | G43 Z50. H3 M8 |
| 21 | G1 Z.1 F2000 | 52 | G99 G81 Z-25. R2. F80 |
| 22 | X-160. F250 | 53 | X-70. |
| 23 | G0 Y-45. | 54 | Y-50. |
| 24 | G1 X160. | 55 | X70. |
| 25 | G0 Y50. S600 | 56 | G0 Z50. M9 |
| 26 | G1 Z0 | 57 | G91 G28 Z0 M6 |
| 27 | X-160. F400 | 58 | M1 |
| 28 | G0 Y-45. | | |
| 29 | G1 X160. | 59 | N4(DRILL 30mm DIA.) |
| 30 | G0 Z50. M9 | 60 | G90 G54 G0 X30. Y0 S300 M3 T5 |
| 31 | G91 G28 Z0 M6 | 61 | G43 Z100. H4 M8 |
| 32 | M1 | 62 | G98 G81 Z-19.9 R2,F60 |
| | | 63 | G55 G0 X40. Y0 |
| | | 64 | Z50. |
| | | 65 | G99 G81 Z-21. R2. F60 |
| | | 66 | X-40. |

Fig. 4B

| | | | |
|---|---|---|---|
| 67 | G0 Z50. M9 | 101 | G43 Z50. H6 M8 |
| 68 | G91 G28 Z0 M6 | 102 | G1 Z-19. F2000 |
| 69 | M1 | 103 | Z-20. F50 |
| | | 104 | G41 Y20. D6 |
| 70 | N5(END MILL 25mm DIA ROUGH) | 105 | G1 X-30. |
| 71 | G90 G54 G0 X30. Y0 S350 M3 T6 | 106 | G3 Y-20. R20. |
| 72 | G43 Z50. H5 M8 | 107 | G1 X30. |
| 73 | G1 Z-10. F2000 | 108 | G3 Y20. R20. |
| 74 | Z-19.9 F35 | 109 | G40 G1 Y0 F200 |
| 75 | G41 X-50. F50 D5 | 110 | G0 Z50. M9 |
| 76 | G3 X-30. Y-20. R20. | 111 | G91 G28 Z0 M6 |
| 77 | G1 X30. | 112 | M1 |
| 78 | G3 Y20. R20. | | |
| 79 | G1 X-30. | 113 | N7(DRILL 8.2mm) |
| 80 | G3 X-50. Y0 R20. | 114 | G90 G55 G0 X40. Y0 S1000 M3 T8 |
| 81 | G40 G1 X-30. F200 | 115 | G43 Z50. H7 M8 |
| 82 | G0 Z100. | 116 | G98 G81 Z-45. R-19. F150 |
| 83 | G55 G0 X40. Y0 | 117 | X-40. |
| 84 | G1 Z-10. F2000 | 118 | G0 Z50. M9 |
| 85 | Z-20. F35 | 119 | G91 G28 Z0 M6 |
| 86 | G41 X20. D15 | 120 | M1 |
| 87 | G3 I20. F50 | | |
| 88 | G40 G1 X40. | 121 | N8(CHAMFER 25mm DIA.) |
| 89 | G0 Z10. | 122 | G90 G54 G0 X70. Y50. S500 M3 T9 |
| 90 | G0 X-40. | 123 | G43 Z10. H8 M8 |
| 91 | G1 Z-10. F2000 | 124 | G98 G81 Z-11. R-8. F50 |
| 92 | Z-20. F35 | 125 | X-70. |
| 93 | G41 X-60. D15 | 126 | Y-50. |
| 94 | G3 I20. F50 | 127 | X70. |
| 95 | G40 G1 X-40. | 128 | G0 Z100. |
| 96 | G0 Z10. M9 | 129 | G55 G0 X40. Y0 S800 |
| 97 | G91 G28 Z0 M6 | 130 | Z10. |
| 98 | M1 | 131 | G98 G81 Z-25. R-22. F80 |
| | | 132 | X-40. |
| 99 | N6(END MILL 25mm DIA FINISH) | 133 | G0 Z50. M9 |
| 100 | G90 G54 G0 X30. Y0 S500 M3 T7 | 134 | G91 G28 Z0 M6 |

Fig. 4C

| | |
|---|---|
| 135 | M1 |
| 136 | N9(TAP M10 P1.25) |
| 137 | G90 G55 G0 X40. Y0 T1 |
| 138 | G43 Z10. H9 M8 |
| 139 | M29 S320 |
| 140 | G98 G84 Z-40. R-10. F400 |
| 141 | X-40. |
| 142 | G0 Z50. M9 |
| 143 | G91 G28 Y0 Z0 M6 |
| 144 | M30 |

Fig. 7

O0001 TOOL LIST

| TOOL NAME | MAKER | HOLDER MODEL | TIP MODEL | TIP MATERIAL | NOMINAL DIAMETER | T CODE | H CODE | D CODE | NUMBER OF TOOTH | LENGTH OF CUTTING TOOTH | EJECTION | PITCH | ANGLE |
|---|---|---|---|---|---|---|---|---|---|---|---|---|---|
| FACE MILL | ABC CO. | A-01 | B-01 | SUPER HARD | 100.000 | 1 | 1 | 1 | 6 | 10.000 | 20.000 | – | 90 |
| CENTER DRILL | ABC CO. | A-02 | B-02 | HIGH-SPEED STEEL | 3.000 | 2 | 2 | 2 | – | 5.000 | 20.000 | – | 60 |
| DRILL | ABC CO. | A-03 | B-03 | HIGH-SPEED STEEL | 20.000 | 3 | 3 | 3 | – | 150.000 | 160.000 | – | 118 |
| DRILL | ABC CO. | A-04 | B-04 | HIGH-SPEED STEEL | 30.000 | 4 | 4 | 4 | – | 150.000 | 160.000 | – | 118 |
| END MILL | ABC CO. | A-05 | B-05 | HIGH-SPEED STEEL | 25.000 | 5 | 5 | 5 | 2 | 50.000 | 50.000 | – | – |
| END MILL | ABC CO. | A-06 | B-06 | HIGH-SPEED STEEL | 25.000 | 6 | 6 | 6 | 2 | 35.000 | 50.000 | – | – |
| DRILL | ABC CO. | A-07 | B-07 | HIGH-SPEED STEEL | 8.200 | 7 | 7 | 7 | – | 50.000 | 100.000 | – | 118 |
| CHAMFER | ABC CO. | A-08 | B-08 | HIGH-SPEED STEEL | 25.000 | 8 | 8 | 8 | 2 | 10.000 | 80.000 | – | 45 |
| TAP | ABC CO. | A-09 | B-09 | HIGH-SPEED STEEL | M10 | 9 | 9 | 9 | – | 30.000 | 50.000 | 1.25 | 45 |

Fig. 8A

G CODE EXPANSION LIST

NT = Next Tool    ST = Spindle Tool    WK = WORK COORDINATE SYSTEM

| LINE NUMBER | O | N | NT | ST | WK | X COORDINATE | Y COORDINATE | Z COORDINATE | S | M | F | AXIS | INTERPOLATION | R | I | J | G80 | G98 | R POINT | G40 | G43 | H CODED CODE |
|---|---|---|---|---|---|---|---|---|---|---|---|---|---|---|---|---|---|---|---|---|---|---|
| 1 | 1 | | | | | | | | | | | | | | | | | | | | | |
| 2 | | | | | | | | | | | | | | | | | | | | | | |
| 3 | | | | | | | | FIRST ORIGIN | | | | | | | | | | | | | | |
| 4 | | | 1 | | | | | | | | | | | | | | | | | | | |
| 5 | | 1 | | | | | | | | | | | | | | | | | | | | |
| 6 | | | | 1 | | | | | | 6 | | | | | | | | | | | | |
| 7 | | | 2 | | 54 | 160.000 | 50.000 | | 400 | 3 | | XY | G0 | | | | 80 | | | 40 | | |
| 8 | | | | | | | | 50.000 | | 8 | | Z | G0 | | | | | | | | | |
| 9 | | | | | | | | 0.100 | | | 2000 | Z | G0 | | | | | | | | | |
| 10 | | | | | | -160.000 | | | | | 250 | X | G1 | | | | | | | | 43 | 1 |
| 11 | | | | | | | -45.000 | | | | | Y | G1 | | | | | | | | | |
| 12 | | | | | | 160.000 | | | | | | X | G1 | | | | | | | | | |
| 13 | | | | | | | 50.000 | | 600 | | | Y | G1 | | | | | | | | | |
| 14 | | | | | | | | 0.000 | | | | Z | G1 | | | | | | | | | |
| 15 | | | | | | -160.000 | | | | | 400 | X | G1 | | | | | | | | | |
| 16 | | | | | | | -45.000 | | | | | Y | G1 | | | | | | | | | |
| 17 | | | | | | 160.000 | | | | | | X | G1 | | | | | | | | | |
| 18 | | | | | | | | 100.000 | | | 2000 | Z | G0 | | | | | | | | | |
| 19 | | | | | 55 | -160.000 | 50.000 | | 400 | | | XY | G0 | | | | | | | | | |
| 20 | | | | | | | | 50.000 | | | | Z | G0 | | | | | | | | | |
| 21 | | | | | | | | 0.100 | | | 250 | Z | G1 | | | | | | | | | |
| 22 | | | | | | 160.000 | | | | | | X | G1 | | | | | | | | | |
| 23 | | | | | | | -45.000 | | | | | Y | G1 | | | | | | | | | |
| 24 | | | | | | -160.000 | | | | | | X | G1 | | | | | | | | | |
| 25 | | | | | | | 50.000 | | | | | Y | G1 | | | | | | | | | |
| 26 | | | | | | | | 0.000 | | | 400 | Z | G1 | | | | | | | | | |
| 27 | | | | | | -160.000 | | | | | | X | G1 | | | | | | | | | |
| 28 | | | | | | | -45.000 | | | | | Y | G1 | | | | | | | | | |
| 29 | | | | | | 160.000 | | | | | | X | G1 | | | | | | | | | |
| 30 | | | | | | | | 50.000 | | 9 | | Z | G0 | | | | | | | | | |
| 31 | | | | 2 | | | | FIRST ORIGIN | | 6 | | Z | G0 | | | | | | | | | |

Fig. 8B

| LINE NUMBER | O | N | NT | ST | WK | X COORDINATE | Y COORDINATE | Z COORDINATE | S | M | F | AXIS | INTERPOLATION | R | J | K | G80 | G98 | R POINT | G40 | G43 | H CODED CODE |
|---|---|---|---|---|---|---|---|---|---|---|---|---|---|---|---|---|---|---|---|---|---|---|
| 32 | | | | | | | | | | | | – | – | | | | | | | | | |
| 33 | | 2 | | | | | | | | | | – | – | | | | | | | | | |
| 34 | | | 3 | | | | | | | 1 | | | | | | | | | | | | |
| 35 | | | | | 54 | 70.000 | 50.000 | 50.000 | #### | 3 | | XY | G0 | | | | | | | | 43 | 2 |
| 36 | | | | | | | | -3.000 | | | 100 | Z | G0 | | | | 81 | 99 | 2.000 | | | |
| 37 | | | | | | | | | | 8 | | Z | | | | | | | | | | |
| 38 | | | | | | -70.000 | -50.000 | | | | | Z | | | | | | | | | | |
| 39 | | | | | | 70.000 | 0.000 | | | | | Z | | | | | | | | | | |
| 40 | | | | | | 30.000 | 0.000 | 100.000 | | | | Z | | | | | | | | | | |
| 41 | | | | | | | | | | | | | | | | | | | | | | |
| 42 | | | " | | 55 | 40.000 | 0.000 | | | | | XY | G0 | | | | | | | | | |
| 43 | | | | | | | | 50.000 | | | | Z | G0 | | | | 81 | 99 | 2.000 | | | |
| 44 | | | | | | | | -3.000 | | | 100 | Z | G0 | | | | | | | | | |
| 45 | | | | | | -40.000 | | | | | | Z | | | | | | | | | | |
| 46 | | | | | | | | 50.000 | | 9 | | Z | G0 | | | | | | | | | |
| 47 | | | | 3 | | | | FIRST ORIGIN | | 6 | | Z | G0 | | | | | | | | | |
| 48 | | | | | | | | | | 1 | | | | | | | | | | | | |
| 49 | | 3 | | | | | | | | | | – | – | | | | | | | | | |
| 50 | | | 4 | | | | | | | 3 | | | | | | | | | | | | |
| 51 | | | | | 54 | 70.000 | 50.000 | 50.000 | 400 | 8 | | XY | G0 | | | | | | | | 43 | 3 |
| 52 | | | | | | | | -25.000 | | | 80 | Z | G0 | | | | 81 | 99 | 2.000 | | | |
| 53 | | | | | | -70.000 | -50.000 | | | | | Z | G0 | | | | | | | | | |
| 54 | | | | | | 70.000 | | 50.000 | | 9 | | Z | G0 | | | | | | | | | |
| 55 | | | | | | | | | | 6 | | Z | | | | | | | | | | |
| 56 | | | | 4 | | | | FIRST ORIGIN | | 1 | | Z | | | | | | | | | | |
| 57 | | | | | | | | | | | | | | | | | | | | | | |
| 58 | | | | | | | | | | | | – | – | | | | | | | | | |
| 59 | | 4 | | | | | | | | | | – | – | | | | | | | | | |
| 60 | | | 5 | | | | | | | 3 | | | | | | | | | | | | |
| 61 | | | | | 54 | 30.000 | 0.000 | 100.000 | 300 | 8 | | XY | G0 | | | | | | | | 43 | 4 |
| 62 | | | | | | | | -19.900 | | | 60 | Z | G0 | | | | 81 | 98 | 2.000 | | | |
| 63 | | | | | 55 | 40.000 | 0.000 | 50.000 | | | | XY | G0 | | | | 81 | 99 | 2.000 | | | |
| 64 | | | | | | | | -21.000 | | | 60 | Z | G0 | | | | | | | | | |
| 65 | | | | | | | | | | | | | | | | | | | | | | |
| 66 | | | | | | -40.000 | | | | | | | | | | | | | | | | |

Fig. 8C

| LINE NUMBER | O | N | NT | ST | WK | X COORDINATE | Y COORDINATE | Z COORDINATE | S | M | F | AXIS | INTERPO-LATION | R | I | J | G80 | G98 | R POINT | G40 | G43 | H CODED | CODE |
|---|---|---|---|---|---|---|---|---|---|---|---|---|---|---|---|---|---|---|---|---|---|---|---|
| 67 | | | | | | | | 50.000 | | 9 | | Z | G0 | | | | | | | | | | |
| 68 | | | | 5 | | | | FIRST ORIGIN | | 6 | | Z | G0 | | | | | | | | | | |
| 69 | | | | | | | | | | 1 | | | | | | | | | | | | | |
| 70 | | 5 | | | | | | | | | | | | | | | | | | | | | |
| 71 | | | 6 | | 54 | 30.000 | 0.000 | | 350 | 3 | | XY | G0 | | | | | | | | | | |
| 72 | | | | | | | | 50.000 | | 8 | | Z | G0 | | | | | | | | | | 5 |
| 73 | | | | | | | | −10.000 | | | 2000 | Z | G1 | | | | | | | | 43 | 5 | |
| 74 | | | | | | | | −19.900 | | | 35 | Z | G1 | | | | | | | | | | |
| 75 | | | | | | −50.000 | | | | | 50 | X | G1 | | | | | | | 41 | | | |
| 76 | | | | | | −30.000 | −20.000 | | | | | XY | G3 | 20.000 | | | | | | | | | |
| 77 | | | | | | 30.000 | | | | | | X | G1 | | | | | | | | | | |
| 78 | | | | | | | 20.000 | | | | | Y | G3 | 20.000 | | | | | | | | | |
| 79 | | | | | | −30.000 | | | | | | X | G1 | | | | | | | | | | |
| 80 | | | | | | −50.000 | 0.000 | | | | | XY | G3 | 20.000 | | | | | | | | | |
| 81 | | | | | | −30.000 | | | | | 200 | X | G1 | | | | | | | 40 | | | |
| 82 | | | | | | | | 100.000 | | | | Z | G0 | | | | | | | | | | |
| 83 | | | | | 55 | 40.000 | 0.000 | | | | | XY | G0 | | | | | | | | | | |
| 84 | | | | | | | | −10.000 | | | 2000 | Z | G1 | | | | | | | | | | 15 |
| 85 | | | | | | | | −20.000 | | | 35 | Z | G1 | | | | | | | 41 | | | |
| 86 | | | | | | 20.000 | | | | | 50 | XY | G3 | | 20.000 | | | | | | | | |
| 87 | | | | | | 40.000 | | 10.000 | | | | X | G1 | | | | | | | 40 | | | |
| 88 | | | | | | | | | | | | Z | G0 | | | | | | | | | | |
| 89 | | | | | | −40.000 | | | | | | X | G0 | | | | | | | | | | |
| 90 | | | | | | | | −10.000 | | | 2000 | Z | G1 | | | | | | | | | | |
| 91 | | | | | | | | −20.000 | | | 35 | Z | G1 | | | | | | | | | | |
| 92 | | | | | | −60.000 | | | | | 50 | XY | G3 | | 20.000 | | | | | 41 | | | |
| 93 | | | | | | −40.000 | | 10.000 | | | | X | G1 | | | | | | | 40 | | | |
| 94 | | | | | | | | | | | | Z | G0 | | | | | | | | | | |
| 95 | | | | | 54 | 30.000 | 0.000 | FIRST ORIGIN | 500 | 9 | | XY | G3 | | | | | | | | | | |
| 96 | | 6 | | | | | | | | 6 | | Z | G1 | | | | | | | | 43 | 6 | |
| 97 | | | 7 | | | | | 50.000 | | 1 | | Z | G0 | | | | | | | | | | 15 |
| 98 | | | | | | | | | | 3 | | | | | | | | | | | | | |
| 99 | | | | | | | | | | 8 | | | | | | | | | | | | | |
| 100 | | | | | | | | | | | | | G0 | | | | | | | | | | |
| 101 | | | | | | | | | | | | | G0 | | | | | | | | | | |

Fig. 8D

| LINE NUMBER | O | N | NT | ST | WK | X COORDINATE | Y COORDINATE | Z COORDINATE | S | M | F | AXIS | INTERPOLATION | R | I | J | G80 | G98 | R POINT | G40 | G43 | H CODED CODE |
|---|---|---|---|---|---|---|---|---|---|---|---|---|---|---|---|---|---|---|---|---|---|---|
| 102 | | | | | | | | -19.000 | | | 2000 | Z | G1 | | | | | | | | | |
| 103 | | | | | | | | -20.000 | | | 50 | Z | G1 | | | | | | | | | |
| 104 | | | | | | | 20.000 | | | | | Y | G1 | | | | | | | 41 | | 6 |
| 105 | | | | | | -30.000 | | | | | | X | G1 | | | | | | | | | |
| 106 | | | | | | | -20.000 | | | | | XY | G3 | 20.000 | | | | | | | | |
| 107 | | | | | | 30.000 | | | | | | X | G1 | | | | | | | | | |
| 108 | | | | | | | 20.000 | | | | | XY | G3 | 20.000 | | | | | | | | |
| 109 | | | | | | | 0.000 | | | | | Y | G1 | | | | | | | 40 | | |
| 110 | | | | | | | | 50.000 | | 9 | | Z | G0 | | | | | | | | | |
| 111 | | | 7 | | | | | FIRST ORIGIN | | 6 | | Z | G0 | | | | | | | | | |
| 112 | | | | | | | | | | 1 | | | | | | | | | | | | |
| 113 | | 7 | | | | | | | | | | | | | | | | | | | | |
| 114 | | | 8 | | 55 | 40.000 | 0.000 | | #### | 3 | | XY | G0 | | | | | | | | | |
| 115 | | | | | | | | 50.000 | | 8 | 150 | Z | G0 | | | | 81 | 98 | -19.0 | | 43 | 7 |
| 116 | | | | | | -40.000 | | -45.000 | | | | | | | | | | | | | | |
| 117 | | | | | | | | | | | | | | | | | | | | | | |
| 118 | | | | | | | | 50.000 | | 9 | | Z | G0 | | | | | | | | | |
| 119 | | | 8 | | | | | FIRST ORIGIN | | 6 | | Z | G0 | | | | | | | | | |
| 120 | | | | | | | | | | 1 | | | | | | | | | | | | |
| 121 | | 8 | | | | | | | | | | | | | | | | | | | | |
| 122 | | | 9 | | 54 | 70.000 | 50.000 | | 500 | 3 | | XY | G0 | | | | | | | | | |
| 123 | | | | | | | | 10.000 | | 8 | 50 | Z | G0 | | | | 81 | 98 | -8.0 | | 43 | 8 |
| 124 | | | | | | -70.000 | | -11.000 | | | | | | | | | | | | | | |
| 125 | | | | | | | -50.000 | | | | | | | | | | | | | | | |
| 126 | | | | | | 70.000 | | | | | | | | | | | | | | | | |
| 127 | | | | | | | | 100.000 | | | | | | | | | | | | | | |
| 128 | | | | | | | 0.000 | | 800 | | | Z | G0 | | | | | | | | | |
| 129 | | | | | 55 | 40.000 | | 10.000 | | | | XY | G0 | | | | | | | | | |
| 130 | | | | | | | | | | | 80 | Z | G0 | | | | 81 | 98 | -22.0 | | 43 | 8 |
| 131 | | | | | | -40.000 | | -25.000 | | | | | | | | | | | | | | |
| 132 | | | | | | | | | | | | | | | | | | | | | | |
| 133 | | | | | | | | 50.000 | | 9 | | Z | G0 | | | | | | | | | |
| 134 | | | 9 | | | | | FIRST ORIGIN | | 6 | | Z | G0 | | | | | | | | | |
| 135 | | | | | | | | | | 1 | | | | | | | | | | | | |
| 136 | | 9 | | | | | | | | | | | | | | | | | | | | |

Fig. 8E

| LINE NUMBER | O | N | NT | ST | WK | X COORDINATE | Y COORDINATE | Z COORDINATE | S | M | F | AXIS | INTERPOLATION | R | I | J | G80 | G98 | R POINT | G40 | G43 | H | CODED CODE |
|---|---|---|---|---|---|---|---|---|---|---|---|---|---|---|---|---|---|---|---|---|---|---|---|
| 137 | | | 1 | | 55 | 40.000 | 0.000 | | | | | XY | G0 | | | | | | | | | | |
| 138 | | | | | | | | 10.000 | | 8 | | Z | G0 | | | | | | | | | | |
| 139 | | | | | | | | | 320 | 29 | | | | | | | | | | | | | |
| 140 | | | | | | −40.000 | | −40.000 | | | 400 | | | | | | 84 | 98 | −10.0 | | | | |
| 141 | | | | 1 | | | | 50.000 | | 9 | | Z | G0 | | | | | | | | 43 | | 9 |
| 142 | | | | | | | | | | 6 | | Z | G0 | | | | | | | | | | |
| 143 | | | | | | | | FIRST ORIGIN | | | | | | | | | | | | | | | |

Fig. 9

WORK ELEMENT AND USING TOOL FOR MACHINING STEP, DEFINITION OF ANALYSIS

| MACHINING STEP | WORK ELEMENT | TOOL | PROGRAM ANALYZING METHOD |
|---|---|---|---|
| FACE | MILL ROUGH | FACE MILL | RECOGNITION BY T CODE OF TOOL LIST |
| FACE | MILL FINISHING | FACE MILL | |
| POCKET | POCKET ROUGH | END MILL | RECOGNITION BY T CODE OF TOOL LIST |
| POCKET | POCKET FINISHING | END MILL | |
| CORE | CORE ROUGH | END MILL | RECOGNITION BY T CODE OF TOOL LIST |
| CORE | CORE FINISHING | END MILL | |
| SLOT | SLOT ROUGH | END MILL | RECOGNITION BY T CODE OF TOOL LIST |
| SLOT | SLOT FIHISHING | END MILL | CUTTING AT LEAST ONCE USING THE UP-CUT SIDE AND THE DOWN-CUT SIDE OF A TOOL SIMULTANEOUSLY |
| HOLE | CENTER HOLE | CENTER DRILL | RECOGNITION BY T CODE OF TOOL LIST CUTTING ONLY IN THE Z DIRECTION |
| HOLE | CENTER HOLE | DRILL | RECOGNITION BY T CODE OF TOOL LIST A DEEP HOLE IS DRILLED AT THE SAME COORDINATE LATER |
| HOLE | CENTER CHAMFER | CHAMFER | RECOGNITION BY T CODE OF TOOL LIST MACHINING BY A CENTER DRILL HAS NOT BEEN PERFORMED AT THE SAME COORDINATE |
| HOLE | DRILL | DRILL | RECOGNITION BY T CODE OF TOOL LIST EXCEPT FOR CENTER HOLE DRILL |
| HOLE | CHAMFER | CHMFER | RECOGNITION BY T CODE OF TOOL LIST A DEEP HOLE HAS BEEN DRILLED AT THE SAME COORDINATE |
| HOLE | CHAMFER | DRILL | RECOGNITION BY T CODE OF TOOL LIST A DEEP HOLE HAS BEEN DRILLED AT THE SAME COORDINATE |
| HOLE | END MILL | END MILL | RECOGNITION BY T CODE OF TOOL LIST CUTTING ONLY IN THE Z DIRECTION |
| HOLE | TAP | TAP | RECOGNITION BY T CODE OF TOOL LIST |
| HOLE | BORING ROUGH | BORING | RECOGNITION BY T CODE OF TOOL LIST |
| HOLE | BORING FINISHING | BORING | RECOGNITION BY T CODE OF TOOL LIST RISE AFTER CUTTING AND RECESS MOTION |

Fig. 10

WORK ELEMENT LIST

| WORK ELEMENT NO. | WORK ELEMENT NAME |
|---|---|
| 1 | MILL ROUGH |
| 2 | MILL FINISHING |
| 3 | POCKET ROUGH |
| 4 | POCKET FINISHING |
| 5 | CORE ROUGH |
| 6 | CORE FINISHING |
| 7 | SLOT ROUGH |
| 8 | SLOT FINISHING |
| 9 | CENTER HOLE |
| 10 | DRILL |
| 11 | TAP |
| 12 | BORE |
| 13 | CHAMFER |

Fig. 11

WORKPIECE DATABASE

| No. | MACHINING STEP | TOOL No. | (WORK ELEMENT) | (TOOL DIAMETER) | (USE) | WORKPIECE FILE | LOCUS LIST FILE |
|---|---|---|---|---|---|---|---|
| 1 | FACE | 1 | MILL ROUGH | 100 | ROUGH | AAA1 | 1234 |
| 2 | FACE | 2 | MILL FINISHING | 100 | FINISHING | AAA1 | 1235 |
| 3 | FACE | 1 | MILL ROUGH | 100 | ROUGH | AAA2 | 1236 |
| 4 | FACE | 2 | MILL FINISHING | 100 | FINISHING | AAA2 | 1237 |
| 5 | POCKET | 6 | POCKET ROUGH | 25 | ROUGH | BBB1 | 12234 |
| 6 | POCKET | 6 | POCKET FINISHING | 25 | FINISHING | BBB1 | 12235 |
| 7 | | | | | | | |
| 8 | | | | | | | |
| 9 | | | | | | | |
| 10 | | | | | | | |
| 11 | | | | | | | |
| 12 | | | | | | | |
| 13 | | | | | | | |
| 14 | | | | | | | |
| 15 | | | | | | | |

NOTE : ALTHOUGH AN ITEM WITH ROUND BRACKETS ( ) IS DETERMINED WHEN A TOOL NO. IS DETERMINED, IT IS ADDED TO MAKE THE LIST EASY TO UNDERSTAND.

Fig. 12

FACE MACHINING PATTERN LIST

I: FINISHING STOCK  K: MACHINING DEPTH  J: CUTTING METHOD

| PROCESS | APPROACH QUANTITY | RECESS QUANTITY | I | K | J |
|---|---|---|---|---|---|
| ROUGH | 10 | 10 | 0.1 | 4.9 | — |
| FINISHING | 10 | 10 | — | 0.1 | — |

POCKET MACHINING STEP PATTERN LIST

| PROCESS | APPROACH QUANTITY | RECESS QUANTITY | I | K | J |
|---|---|---|---|---|---|
| ROUGH | — | — | 0.1 | 19.9 | — |
| FINISHING | — | — | — | 0.1 | — |

CORE MACHINING STEP PATTERN LIST

| PROCESS | APPROACH QUANTITY | RECESS QUANTITY | I | K | J |
|---|---|---|---|---|---|
| ROUGH | — | — | — | — | — |
| FINISHING | — | — | — | — | — |

SLOT MACHINING STEP PATTERN LIST

P: SLOT WIDTH

| PROCESS | APPROACH QUANTITY | RECESS QUANTITY | I | J | K | P |
|---|---|---|---|---|---|---|
| ROUGH | — | — | — | — | — | — |
| FINISHING | — | — | — | — | — | — |

HOLE MACHINING STEP PATTERN LIST

| MACHINING TYPE | FINAL DIAMETER | SPOT FACING DIAMETER | CHAMFER TOOL | TOOL 1 | TOOL DIAMETER 1 | TOOL 2 | TOOL DIAMETER 2 | TOOL 3 | TOOL DIAMETER 3 | TOOL 4 | TOOL DIAMETER 4 | TOOL 5 | TOOL DIAMETER 5 |
|---|---|---|---|---|---|---|---|---|---|---|---|---|---|
| DRILL | 20 | — | 25 | CENTER DRILL | 3 | DRILL | 20 | — | — | — | — | — | — |
| TAP | M10 | — | — | — | — | — | — | — | — | — | — | — | — |
| WASHER FACED HEAD TAP | M10 | 40 | 25 | CENTER DRILL | 3 | DRILL | 30 | END MILL | 25 | DRILL | 8 | M10 | TAP |
| REAMER | — | — | — | — | — | — | — | — | — | — | — | — | — |
| WASHER FACED HEAD REAMER | — | — | — | — | — | — | — | — | — | — | — | — | — |
| BORING | — | — | — | — | — | — | — | — | — | — | — | — | — |
| WASHER FACED HEAD REAMER | — | — | — | — | — | — | — | — | — | — | — | — | — |
| SPOT FACING | — | — | — | — | — | — | — | — | — | — | — | — | — |

Fig. 13

IN ANALYZING ORDER

| TOOL NUMBER | TOOL NAME | DIAMETER OF TOOL | WK | X | Y | Z | CYCLE | DIAMETER OF HOLE |
|---|---|---|---|---|---|---|---|---|
| 2 | CENTER DRILL | 3 | 54 | 70 | 50 | -3 | 81 | 3 |
| 2 | CENTER DRILL | 3 | 54 | -70 | 50 | -3 | 81 | 3 |
| 2 | CENTER DRILL | 3 | 54 | -70 | -50 | -3 | 81 | 3 |
| 2 | CENTER DRILL | 3 | 54 | 70 | -50 | -3 | 81 | 3 |
| 2 | CENTER DRILL | 3 | 54 | 30 | 0 | -3 | 81 | 3 |
| 2 | CENTER DRILL | 3 | 55 | 40 | 0 | -3 | 81 | 3 |
| 2 | CENTER DRILL | 3 | 55 | -40 | 0 | -3 | 81 | 3 |
| 3 | DRILL | 20 | 54 | 70 | 50 | -25 | 81 | 20 |
| 3 | DRILL | 20 | 54 | -70 | 50 | -25 | 81 | 20 |
| 3 | DRILL | 20 | 54 | -70 | -50 | -25 | 81 | 20 |
| 3 | DRILL | 20 | 54 | 70 | -50 | -25 | 81 | 20 |
| 4 | DRILL | 30 | 54 | 30 | 0 | -19.9 | 81 | 30 |
| 4 | DRILL | 30 | 55 | 40 | 0 | -21 | 81 | 30 |
| 4 | DRILL | 30 | 55 | -40 | 0 | -21 | 81 | 30 |
| 5 | END MILL | 25 | 55 | 40 | 0 | -20 | COMPLETE ROUND | 40 |
| 5 | END MILL | 25 | 55 | -40 | 0 | -20 | COMPLETE ROUND | 40 |
| 7 | DRILL | 8.2 | 55 | 40 | 0 | -45 | 81 | 8.2 |
| 7 | DRILL | 8.2 | 55 | -40 | 0 | -45 | 81 | 8.2 |
| 8 | CHAMFER | 25 | 54 | 70 | 50 | -11 | 81 | 22 |
| 8 | CHAMFER | 25 | 54 | -70 | 50 | -11 | 81 | 22 |
| 8 | CHAMFER | 25 | 54 | -70 | -50 | -11 | 81 | 22 |
| 8 | CHAMFER | 25 | 54 | 70 | -50 | -11 | 81 | 22 |
| 8 | CHAMFER | 25 | 55 | 40 | 0 | -25 | 81 | 10 |
| 8 | CHAMFER | 25 | 55 | -40 | 0 | -25 | 81 | 10 |
| 9 | TAP | M10 | 55 | 40 | 0 | -40 | 81 | 10 |
| 9 | TAP | M10 | 55 | -40 | 0 | -40 | 81 | 10 |

Fig. 14

IN THE SAME HOLE ORDER

| T | TOOL NAME | DIAMETER OF TOOL | WK | X | Y | Z | CYCLE | DIAMETER OF HOLE |
|---|---|---|---|---|---|---|---|---|
| 2 | CENTER DRILL | 3 | 54 | -70 | -50 | -3 | 81 | 3 |
| 3 | DRILL | 20 | 54 | -70 | -50 | -25 | 81 | 20 |
| 8 | CHAMFER | 25 | 54 | -70 | -50 | -11 | 81 | 22 |
| 2 | CENTER DRILL | 3 | 54 | -70 | 50 | -3 | 81 | 3 |
| 3 | DRILL | 20 | 54 | -70 | 50 | -25 | 81 | 20 |
| 8 | CHAMFER | 25 | 54 | -70 | 50 | -11 | 81 | 22 |
| 2 | CENTER DRILL | 3 | 54 | 30 | 0 | -3 | 81 | 3 |
| 4 | DRILL | 30 | 54 | 30 | 0 | -19.9 | 81 | 30 |
| 2 | CENTER DRILL | 3 | 54 | 70 | -50 | -3 | 81 | 3 |
| 3 | DRILL | 20 | 54 | 70 | -50 | -25 | 81 | 20 |
| 8 | CHAMFER | 25 | 54 | 70 | -50 | -11 | 81 | 22 |
| 2 | CENTER DRILL | 3 | 54 | 70 | 50 | -3 | 81 | 3 |
| 3 | DRILL | 20 | 54 | 70 | 50 | -25 | 81 | 20 |
| 8 | CHAMFER | 25 | 54 | 70 | 50 | -11 | 81 | 22 |
| 2 | CENTER DRILL | 3 | 55 | -40 | 0 | -3 | 81 | 3 |
| 4 | DRILL | 30 | 55 | -40 | 0 | -21 | 81 | 30 |
| 5 | END MILL | 25 | 55 | -40 | 0 | -20 | COMPLETE ROUND | 40 |
| 7 | DRILL | 8.2 | 55 | -40 | 0 | -45 | 81 | 8.2 |
| 8 | CHAMFER | 25 | 55 | -40 | 0 | -25 | 81 | 10 |
| 9 | TAP | M10 | 55 | -40 | 0 | -40 | 81 | 10 |
| 2 | CENTER DRILL | 3 | 55 | 40 | 0 | -3 | 81 | 3 |
| 4 | DRILL | 30 | 55 | 40 | 0 | -21 | 81 | 30 |
| 5 | END MILL | 25 | 55 | 40 | 0 | -20 | COMPLETE ROUND | 40 |
| 7 | DRILL | 8.2 | 55 | 40 | 0 | -45 | 81 | 8.2 |
| 8 | CHAMFER | 25 | 55 | 40 | 0 | -25 | 81 | 10 |
| 9 | TAP | M10 | 55 | 40 | 0 | -40 | 81 | 10 |

Fig. 15

CUTTING CONDITION DATABASE

F1: FEEDING QUANTITY PER TOOTH  W: CUTTING WIDTH PER FEED  TIP POINT: THE NUMBER OF TIMES  E.Angle=CUTTING START ANGLE
F2: FEEDING QUANTITY PER ROTATION  H: CUTTING HEIGHT PER FEED  WORKPIECE IS CONTAINED  DE.Angle=CUTTING END ANGLE

| CUTTING CONDITION NO. | WORK ELEMENT | MATERIAL OF WORK | TOOL NUMBER | CUTTING SPEED | F1 | F2 | W | H | TIP POINT 1 | TIP POINT 2 | TIP POINT 3 | TIP POINT 4 | TIP POINT 5 | CUTTING TIME | CUTTING DISTANCE | E.Angle | DE.Angle |
|---|---|---|---|---|---|---|---|---|---|---|---|---|---|---|---|---|---|
| 1 | MILL ROUGH | FC | 1 | 126 | 0.1 | — | 80 | 4.9 | 10020 | 10254 | 10280 | 10281 | 8245 | 0:10:25 | 50.012 | | |
| 2 | CENTER | FC | 2 | 9.4 | — | 0.1 | — | — | 10425 | 10245 | 10341 | 15420 | 11024 | 0:03:20 | 25.213 | | |
| 3 | DRILL | FC | 3 | 25.1 | — | 0.2 | — | — | 30124 | 32514 | 36544 | 32120 | 32120 | 0:05:58 | 40.365 | | |
| 4 | DRILL | FC | 4 | 28.3 | — | 0.2 | — | — | 10452 | 10245 | 14210 | 12452 | 10342 | 0:06:30 | 25.542 | | |
| 5 | POCKET ROUGH | FC | 5 | 27.5 | 0.07 | 0.1 | 25 | 19.9 | 22101 | 22321 | 22314 | 21000 | 18754 | 0:20:31 | 60.842 | | |
| 6 | POCKET FINISHING | FC | 6 | 39.2 | 0.1 | 0.1 | 0.1 | 0.1 | 10245 | 12221 | 13212 | 12121 | 74545 | 0:35:02 | 96.998 | | |
| 7 | DRILL | FC | 7 | 25.7 | — | 0.15 | — | — | 36452 | 36412 | 36412 | 36545 | 32565 | 0:03:56 | 5.774 | | |
| 8 | CHAMFER | FC | 8 | 25 | — | 0.1 | — | — | 12451 | 12451 | 12451 | 12451 | 8456 | 0:07:21 | 15.445 | | |
| 9 | TAP | FC | 9 | 10 | — | — | — | — | 22541 | 22654 | 22142 | 15412 | 120 | 0:15:41 | 27.649 | | |

Fig. 16

TOOL DATABASE

| T CODE (TOOL NUMBER) | WORK ELEMENT NO. | TOOL NAME | MAKER | HOLDER | TIP MODEL | TIP MATERIAL | NOMINAL DIAMETER | H CODE | D CODE | NUMBER OF TOOTH | LENGTH OF CUTTING TOOTH | EJECTION | PTICH | ANGLE | WEAR | LIFE | REMAINDER OF LIFE | LIFE STATUS |
|---|---|---|---|---|---|---|---|---|---|---|---|---|---|---|---|---|---|---|
| 1 | 1 | FACE MILL | ABC CO. | A-01 | B-01 | SUPER HARD | 100.000 | 1 | 1 | 6 | 10.000 | 20.000 | – | 90 | −0.001 | 71,132 | 60,192 | OK |
| 2 | 9 | CENTER DRILL | ABC CO. | A-02 | B-02 | HIGH-SPEED STEEL | 3.000 | 2 | 2 | – | 5.000 | 20.000 | – | – | 0.000 | 62,219 | 10,503 | OK |
| 3 | 10 | DRILL | ABC CO. | A-03 | B-03 | HIGH-SPEED STEEL | 20.000 | 3 | 3 | – | 150.000 | 160.000 | – | 118 | −0.001 | 33,872 | 6,476 | OK |
| 4 | 10 | DRILL | ABC CO. | A-04 | B-04 | HIGH-SPEED STEEL | 30.000 | 4 | 4 | – | 150.000 | 160.000 | – | 118 | 0.000 | 54,262 | 35,039 | OK |
| 5 | 3 | END MILL | ABC CO. | A-05 | B-05 | HIGH-SPEED STEEL | 25.000 | 5 | 5 | 2 | 50.000 | 50.000 | – | – | 0.000 | 50,631 | 14,379 | OK |
| 6 | 4 | END MILL | ABC CO. | A-06 | B-06 | HIGH-SPEED STEEL | 25.000 | 6 | 6 | 2 | 35.000 | 50.000 | – | – | −0.001 | 132 | 102 | OK |
| 7 | 10 | DRILL | ABC CO. | A-07 | B-07 | HIGH-SPEED STEEL | 8.200 | 7 | 7 | – | 50.000 | 100.000 | – | – | −0.002 | 76,211 | 4,100 | OK |
| 8 | 14 | CHAMFER | ABC CO. | A-08 | B-08 | HIGH-SPEED STEEL | 25.000 | 8 | 8 | 2 | 10.000 | 80.000 | – | 45 | 0.000 | 91,026 | 9,558 | OK |
| 9 | 11 | TAP | ABC CO. | A-09 | B-09 | HIGH-SPEED STEEL | M10 | 9 | 9 | – | 30.000 | 50.000 | 1.25 | 45 | 0.000 | 92,640 | 48,954 | OK |
| 10 | 10 | DRILL | ABC CO. | A-10 | B-10 | HIGH-SPEED STEEL | 3.000 | 10 | 10 | – | 100.000 | 120.000 | – | 118 | −0.002 | 49,323 | 35,674 | OK |
| 11 | 10 | DRILL | ABC CO. | A-11 | B-11 | HIGH-SPEED STEEL | 5.100 | 11 | 11 | – | 100.000 | 120.000 | – | 118 | −0.001 | 4,501 | 3,144 | OK |
| 12 | 10 | DRILL | ABC CO. | A-12 | B-12 | HIGH-SPEED STEEL | 6.500 | 12 | 12 | – | 100.000 | 120.000 | – | 118 | 0.000 | 49,179 | 40,371 | OK |
| 13 | 10 | DRILL | ABC CO. | A-13 | B-13 | HIGH-SPEED STEEL | 6.800 | 13 | 13 | – | 120.000 | 150.000 | – | 118 | 0.000 | 6,747 | 970 | OK |
| 14 | 10 | DRILL | ABC CO. | A-14 | B-14 | HIGH-SPEED STEEL | 8.000 | 14 | 14 | – | 120.000 | 150.000 | – | 118 | −0.002 | 84,239 | 48,929 | OK |
| 15 | 10 | DRILL | ABC CO. | A-15 | B-15 | HIGH-SPEED STEEL | 10.000 | 15 | 15 | – | 120.000 | 150.000 | – | 118 | 0.000 | 84,067 | 46,855 | OK |
| 16 | 11 | TAP | ABC CO. | A-16 | B-16 | HIGH-SPEED STEEL | M8 | 16 | 16 | – | 30.000 | 50.000 | 1.25 | – | −0.001 | 40,952 | 32,550 | OK |
| 17 | 11 | TAP | ABC CO. | A-17 | B-17 | HIGH-SPEED STEEL | M6 | 17 | 17 | – | 30.000 | 50.000 | 1.00 | – | 0.000 | 10,966 | 8,075 | OK |
| 18 | 11 | TAP | ABC CO. | A-18 | B-18 | HIGH-SPEED STEEL | M12 | 18 | 18 | – | 35.000 | 50.000 | 1.75 | – | 0.000 | 60,323 | 26,830 | OK |
| 19 | 11 | TAP | ABC CO. | A-19 | B-19 | HIGH-SPEED STEEL | M14 | 19 | 19 | – | 35.000 | 50.000 | 2.00 | – | 0.000 | 9,686 | 5,040 | OK |
| 20 | 5 | END MILL | ABC CO. | A-20 | B-20 | HIGH-SPEED STEEL | 6.000 | 20 | 20 | 2 | 20.000 | 50.000 | – | – | −0.006 | 59,777 | 0 | END |
| 21 | 6 | END MILL | ABC CO. | A-21 | B-21 | HIGH-SPEED STEEL | 8.000 | 21 | 21 | 2 | 25.000 | 60.000 | – | – | −0.002 | 99,479 | 90,581 | OK |
| 22 | 5 | END MILL | ABC CO. | A-22 | B-22 | HIGH-SPEED STEEL | 10.000 | 22 | 22 | 2 | 25.000 | 60.000 | – | – | −0.001 | 67,384 | 63,331 | OK |
| 23 | 6 | END MILL | ABC CO. | A-23 | B-23 | HIGH-SPEED STEEL | 12.000 | 23 | 23 | 2 | 25.000 | 60.000 | – | – | −0.005 | 91,676 | 0 | END |
| 24 | 9 | CENTER DRILL | ABC CO. | A-24 | B-24 | HIGH-SPEED STEEL | 5.000 | 24 | 24 | – | 3.000 | 20.000 | – | – | 0.000 | 72,694 | 36,524 | OK |
| 25 | 9 | CENTER DRILL | ABC CO. | A-25 | B-25 | HIGH-SPEED STEEL | 1.000 | 25 | 25 | – | 3.000 | 20.000 | – | – | 0.000 | 86,540 | 58,536 | OK |
| 26 | 14 | CHAMFER | ABC CO. | A-26 | B-26 | HIGH-SPEED STEEL | 20.000 | 26 | 26 | 1 | 10.000 | 80.000 | – | 45 | 0.000 | 22,437 | 4,951 | OK |
| 27 | 5 | END MILL | ABC CO. | A-27 | B-27 | HIGH-SPEED STEEL | 35.000 | 27 | 27 | 2 | 50.000 | 60.000 | – | – | −0.001 | 814 | 636 | OK |
| 28 | 6 | END MILL | ABC CO. | A-28 | B-28 | HIGH-SPEED STEEL | 16.000 | 28 | 28 | 2 | 30.000 | 50.000 | – | – | −0.002 | 25,049 | 17,324 | OK |
| 29 | 2 | FACE MILL | ABC CO. | A-29 | B-29 | HIGH-SPEED STEEL | 80.000 | 29 | 29 | 6 | 15.000 | 20.000 | – | 45 | 0.000 | 1,760 | 1,643 | OK |
| 30 | 10 | DRILL | ABC CO. | A-30 | B-30 | HIGH-SPEED STEEL | 21.000 | 30 | 30 | – | 100.000 | 120.000 | – | 118 | −0.001 | 78,657 | 64,750 | OK |
| 31 | 10 | DRILL | ABC CO. | A-31 | B-31 | HIGH-SPEED STEEL | 22.000 | 31 | 31 | – | 100.000 | 120.000 | – | 118 | −0.001 | 63,881 | 166 | OK |
| 32 | 10 | DRILL | ABC CO. | A-32 | B-32 | HIGH-SPEED STEEL | 25.000 | 32 | 32 | – | 100.000 | 120.000 | – | 118 | −0.004 | 74,067 | 0 | END |

Fig. 17

DEFINITION OF GENERAL MACHINING PATTERN OF MACHINING STEP

| MACHINING STEP | MACHINING PATTERN |
|---|---|
| FACE | USING TOOL : FACE MILL, END MILL |
| | • AT APPROACH POINT (A POINT BEGINNING XY-MOVEMENT IN CUTTING FEEDING,) A WORKPIECE AND A TOOL DO NOT INTERFERE. [JUDGMENT 1]<br>• AT RECESS POINT ( A POINT CHANGING FROM CUTTING FEEDING TO A RAPID TRAVERSE,) A WORKPIECE AND A TOOL DO NOT INTERFERE. [JUDGMENT 1]<br>• A CUTTING AREA COVERS THE ENTIRE AREA OF A WORKPIECE. [JUDGMENT 2]<br>• A CUTTING DIRECTION IS ONE DIRECTION (CUTTING BY MOVEMENT EITHER X AXIS OR Y AXIS.) [JUDGMENT 3] |
| POCKET | USING TOOL : END MILL |
| | • AFTER A TOOL FALLS TO A MACHINING FACE, A LOCUS IS CLOSED UNTIL RISING. [JUDGMENT 4]<br>• A CUTTING AREA DOES NOT JUT OUT FROM A WORK AREA. [JUDGMENT 5]<br>• A TOOL FALLS TO A MACHINING FACE, THERE ARE NO CUTTING REMNANTS IN X-Y PLANE AT A FIST CLOSED LOCUS (THERE ARE NO CUTTING REMNANTS IN X-Y PLANE AT HELICAL CUTTING.) [JUDGMENT 6]<br>• A CUTTING AREA DOES NOT JUT OUT FROM A WORK AREA. [JUDGMENT 7] |
| CORE | USING TOOL : END MILL |
| | • A CUTTING AREA INTERSECTS WITH THE AREA OF A WORK. [JUDGMENT 8] |
| SLOT | USING TOOL : END MILL |
| | • CUT WITH THE SAME PLANE, TWO FINAL CUT FIGURES GENERATED BY CUTTING ARE PARALLEL OR SIMILAR FIGURES. [JUDGMENT 9] |
| HOLE | USING TOOL : CENTER DRILL, DRILL, TAP, REAMER, BORING, END MILL, CHAMFER, AND ANGULAR |
| | • USING A DRILLED AND FIXED CYCLE [JUDGMENT 10]<br>• CUTTING ONLY IN Z AXIS DIRECTION [JUDGMENT 11]<br>• CUTTING THE SAME COORDINATE BY ANOTHER TOOL [JUDGMENT 12] |

METHOD AND DEVICE FOR ANALYZING NC PROGRAM FOR NC MACHINING

TECHNICAL FIELD OF THE INVENTION

The present invention relates to a method and apparatus for analyzing an NC program in NC machining, and more particularly, to an improved method and apparatus for analyzing an NC program in NC machining for performing a variety of machining controls using numerical control information, by which it is possible to abstract various machining information or machining conditions from an NC program used for actual machining and to store them as general purpose information which is expansively usable for a numerically controlled machine tool or another type of a numerically controlled machine tool.

BACKGROUND OF THE INVENTION

A numerically controlled machine tool, in which an action of the machine tool can be automatically controlled by an NC program input, has been extensively utilized in various industrial fields as a computer numerically controlled machine tool (CNC machine tool) by being combined with micro processor techniques, power electronics techniques, or software techniques in recent years.

Numerical control information such as an NC program typically includes unique information such as a tool indexing command, a spindle rotational speed command, a feeding speed command, a moving and interpolation command, or an auxiliary function command, and a machining history. Numerical control information, which is necessary for machining to be tool controlled, is formed as an NC program for every machine tool.

In a prior art, numerical control information has been formed as a desired NC program using CAD/CAM or an automatic programming tool, under conditions where material data and a final parts shape are given, adjusted (i.e., corrected and edited) by repeatedly simulating or test-cutting with an actual machine tool at a machining site, and finally used for controlling machining of the tool as an actual machining NC program. Such a prior process for generating an NC program will now be described with reference to FIG. 1.

Material data and a final parts shape consisting of a work shape, drawing data, or the like are supplied to a process design section 1, where respective processes are determined on the basis of information with regard to a machine tool, and a jig or a holder read from a machine specification database 2, and a jig and a holder database 3. The term "process" means a group of all machining steps in which a workpiece never changes its fixed position. The term "machining step" means a group of work elements at the identical machining position of the workpiece. In other words, the term "work element" means a single machining or process performed by a tool, such as drilling or milling, and the term "machining step" means completing a single machining operation at the identical machining position of the workpiece by combining a plurality of work elements. For example, in screw hole cutting, a single machining step consists of three work elements; a center hole machining, a prepared hole machining, and a tapping machining.

After the above-described processes are determined at the process design section 1, in a work design section 4, machining steps to be performed at respective processes and work elements which are necessary for completing the machining steps are recognized on the basis of a work expansion database 5. A tool list and a work instruction sheet for respective work elements are next formed as shown by reference numerals 9 and 10 by using machining information from a tool database 6, a cutting condition database 7, and a machining time calculating database 8. Further, original numerical control information shown as a first process NC program, a second process NC program, etc. is outputted. There is a problem in that the original NC program formed should not mention that it is an optimal program. Therefore the original NC program is transmitted to an NC program correcting and editing section 11, at which a simulation, an idle operation, or a test cutting is performed on the basis of the output numerical control information so as to optimize a tool path and cutting conditions such as a cutting speed, a feeding speed, or a depth of cutting. It is necessary to incorporate know-how obtained at an actual machining site to optimize the program in addition to the above-mentioned simulating or test cutting method. However, in a prior art, since there is no database for doing such correcting work, it is done manually by a skilled worker in a usual case.

For example, in a case where chatter is generated at a part of a workpiece when numerical control information outputted from a CAM is test cut, the numerical control information is required to correct and alter a feeding speed or a rotation frequency of the part or to alter a width or a depth of cutting. Such correction is done by a skilled worker at a machining site in a prior art, and the original NC program is directly corrected at the NC program correcting and editing section 11.

Furthermore, when a tool path is also required to be delicately corrected, it is impossible to perform such feedback due to lack of CAM ability or the like in many cases. Even if the change of the databases is necessary; therefore, the know-how possessed by a machining site worker was rarely feedback to the databases to form an NC program.

Moreover, the reason for requiring the correction of an original NC program at a machining site in the prior art is that the original NC program for a unique workpiece is not always applied to a unique machine tool. Accordingly, the change of numerical control information may be required depending on ability or specification of a machine tool, which in turn needs to calculate a machining time again and to alter respective work instruction sheets.

After such optimization is done, the tool list and the work instruction sheet are formed again, and sent to a numerical control section 14 as a corrected first process tool list and work instruction sheet 12 and a corrected second process tool list and work instruction sheet 13. Therefore, in the prior art, these corrected first process NC program, second process NC program, etc. are used as actual machining NC programs at an actual machining site.

As described above, in the conventional NC machining system, there are problems such that work for correcting and editing numerical control information is not repeatedly utilized, feedback, or stored so as to be reusable as know-how. There is a large problem that it is difficult to reuse the program correcting and editing data such as various know-how at a machining site because the correction of the data is totally dependent on a skilled worker in the prior art as mentioned above. This means that an original NC program, which can be easily formed using a CAD/CAM system or an automatic programming system, can not be directly applied to each individual machine tool in the prior art; and therefore the editing and correction of the program are required for every machining process. An actual machining NC program, which is usable at a machining site, as a machining program for quantity production, can be obtained after such complicated processes have been completed. Accordingly, it does not sufficiently satisfy a machine tool user from the viewpoint of simple and easy use.

In addition, it is, of course, necessary to correct an NC program drastically when the type of machine tool is changed. Furthermore, such situations arise that an NC program formed in the past can not be utilized when a new machine tool of different type or an identical type with an improved specification is introduced.

In view of the foregoing problems, the object of the present invention is to analyze an actual machining NC program which has been corrected and edited, to extract various machining conditions such as know-how obtained at a machining site from an actual machining NC program actually used at the machining site for quantity production or an optimal machining information or machining conditions for a unique workpiece, and to allow them to be used as databases. The abstracted machining information or machining conditions will retrieve an optimal machining method or an optimal machining condition, which is inherent in respective machines, by being systematically associated with material information, drawing information, machine information, tool information or measured data, etc., which in turn allows an optimal machining program for respective machining sites and respective cases to be automatically and instantaneously programmed from the feedback databases. The databases can be supplied not only to one machine tool but also another machine tool. Therefore, it will be possible to perform all or the major part of correction and editing in accordance with a dialogue with the databases without depending on a skilled worker by opening the databases to all machine tools constituting a CIM (Computer Integrated Manufacturing) facility.

SUMMARY OF THE INVENTION

The present invention is an apparatus for analyzing an NC program in NC machining, wherein the NC machining is controlled by the NC program, comprising: machining method analyzing means for abstracting machining information or a machining condition by analyzing the NC program; and storage means for storing the machining condition rewritably.

The present invention is an apparatus for analyzing an NC program in NC machining, wherein the NC machining is controlled by the NC program, comprising: machining method analyzing means for abstracting machining information or a machining condition for each work element machining by analyzing the NC program; and storage means for storing the machining condition rewritably so as to correspond to each work element machining.

The present invention is an NC machining apparatus for performing NC machining controlled by an NC program comprising:

machining method analyzing means, to which an actual machining NC program, material data and a tool list are inputted, for abstracting machining information or a machining condition for each work element machining by analyzing the actual machining NC program; database forming means for converting the machining information or the machining condition abstracted for each work element machining into a database which is necessary to form the NC program; and an NC program forming database for storing the machining condition rewritably so as to correspond to each work element machining.

Furthermore, the present invention is an apparatus for analyzing an NC program in NC machining, according to claim 1, 2, or 3, wherein said machining method analyzing means comprising: a dividing section for dividing an actual machining NC program into respective work element machinings; and a machining condition abstracting section for abstracting a machining condition from the actual machining NC program.

In addition, the present invention is an apparatus for analyzing an NC program in an NC machining, according to claim 4, wherein a pattern definition storing section for collating and judging the work element machining from a tool machining locus is connected to the dividing section for dividing the actual machining NC program into respective work element machinings.

Moreover, the present invention is an NC machining apparatus for reforming NC machining according to claim 3, wherein the database contains at least a cutting condition database and a tool database.

In another aspect, the present invention is a method for analyzing an NC program in NC machining, wherein the NC machining is controlled by the NC program, comprising: a machining method analyzing step for abstracting machining information or a machining condition by analyzing the NC program; and a storage step for storing the machining condition rewritably.

Furthermore, the present invention is a method for performing NC machining controlled by an NC program comprising: a machining method analyzing step for abstracting machining information or a machining condition for each work element machining by analyzing the NC program; and a storage step for storing the machining condition rewritably so as to correspond to each work element machining.

Moreover, the present invention is a method for performing NC machining controlled by an NC program comprising: a machining method analyzing step, at which an actual machining NC program, material data and a tool list are inputted, for abstracting machining information or a machining condition for each work element machining by analyzing the actual machining NC program; and a database forming step for storing the machining information on the machining condition abstracted for each work element machining rewritably so as to correspond to each work element machining as a database which is necessary to form the NC program.

In another aspect, the present invention is a computer program product, which is executed by a computer, comprising a recording medium having a set of computer program instructions recorded thereon, the computer program product comprising: machining method analyzing means, recorded on the recording medium, for abstracting machining information or a machining condition by analyzing an NC program; and storage means, recorded on the recording medium, for storing the machining condition rewritably.

BRIEF DESCRIPTION OF DRAWINGS

FIGS. 4A, 4B, and 4C show one example of an actual machining NC program used in an embodiment of the present invention.

FIG. 7 shows a tool list according to an embodiment of the present invention.

FIGS. 8A, 8B, 8C, 8D, 8E are G-code expansion lists obtained from the actual machining NC program according to an embodiment of the present invention.

FIG. 9 is a list of work elements, used tools, and program analyzing method relative to an individual machining step according to an embodiment of the present invention.

FIG. 10 is a work element list.

FIG. 11 shows an example of a workpiece database as an intermediate database according to an embodiment of the present invention.

FIG. 12 shows an example of a machining pattern list database as an intermediate database according to an embodiment of the present invention.

FIG. 13 shows an example of a drilling element list database (in analyzing order) as an intermediate database according to an embodiment of the present invention.

FIG. 14 shows an example of a drilling element list database (in the same hole order) as an intermediate database according to an embodiment of the present invention.

FIG. 15 shows an example of a cutting condition database which shows machining conditions for individual work element machining according to an embodiment of the present invention.

FIG. 16 shows an example of a tool database which shows tool machining conditions for individual work element machining according to an embodiment of the present invention.

FIG. 17 shows an example of machining pattern definition according to an embodiment of the present invention.

DETAILED DESCRIPTION OF THE PREFERRED EMBODIMENTS

Preferred embodiments of the present invention will now be described in detail with reference to the accompanying drawings.

Figure 2:
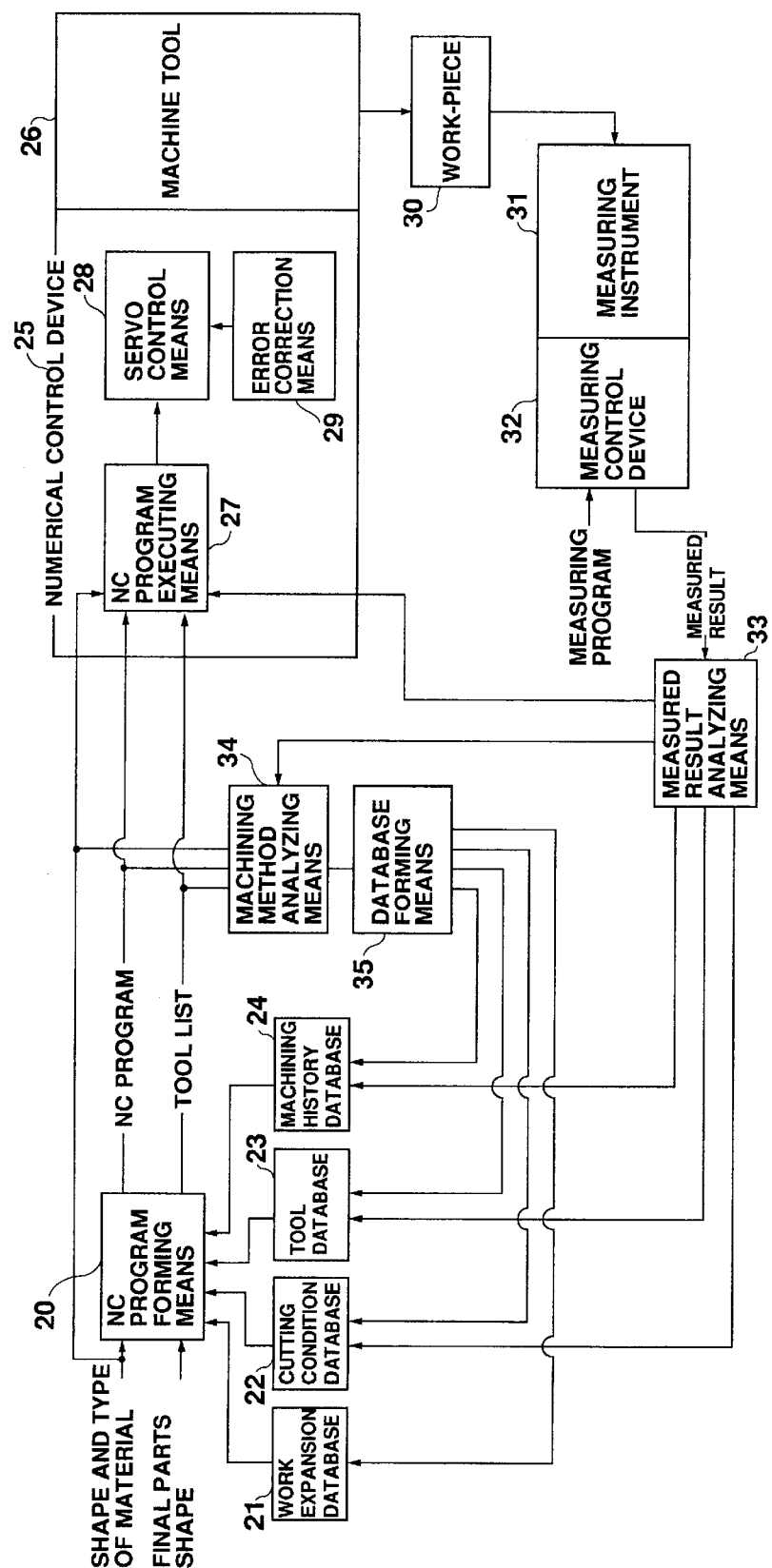
FIG. 2 is a block diagram showing the entire constitution of a numerical control system in which a method and apparatus for analyzing an NC program according to the present invention are incorporated.

Referring to FIG. 2, the entire constitution of a numerical control machine tool system in which a method and apparatus for analyzing an NC program according to the present invention are incorporated is shown.

An NC program is formed in a condition where material data and a final parts shape are given, similarly to the prior art. In the drawing, the material data includes the shape and the type of the material. NC program forming means 20 forms a desired NC program on the basis of the inputted material data and the final parts shape plus know-how data, stored in the past, given from various databases. In the present embodiment, the databases consist of a work expansion database 21, a cutting condition database 22, a tool database 23, and a machining history database 24. The know-how obtained at a machining site in the past, necessary conditions for actual machining, and conditions unique to a machine tool used are supplied to the NC program forming means 20 as reference data for forming an NC program from each of the databases 21, 22, 23, and 24.

Figure 1:
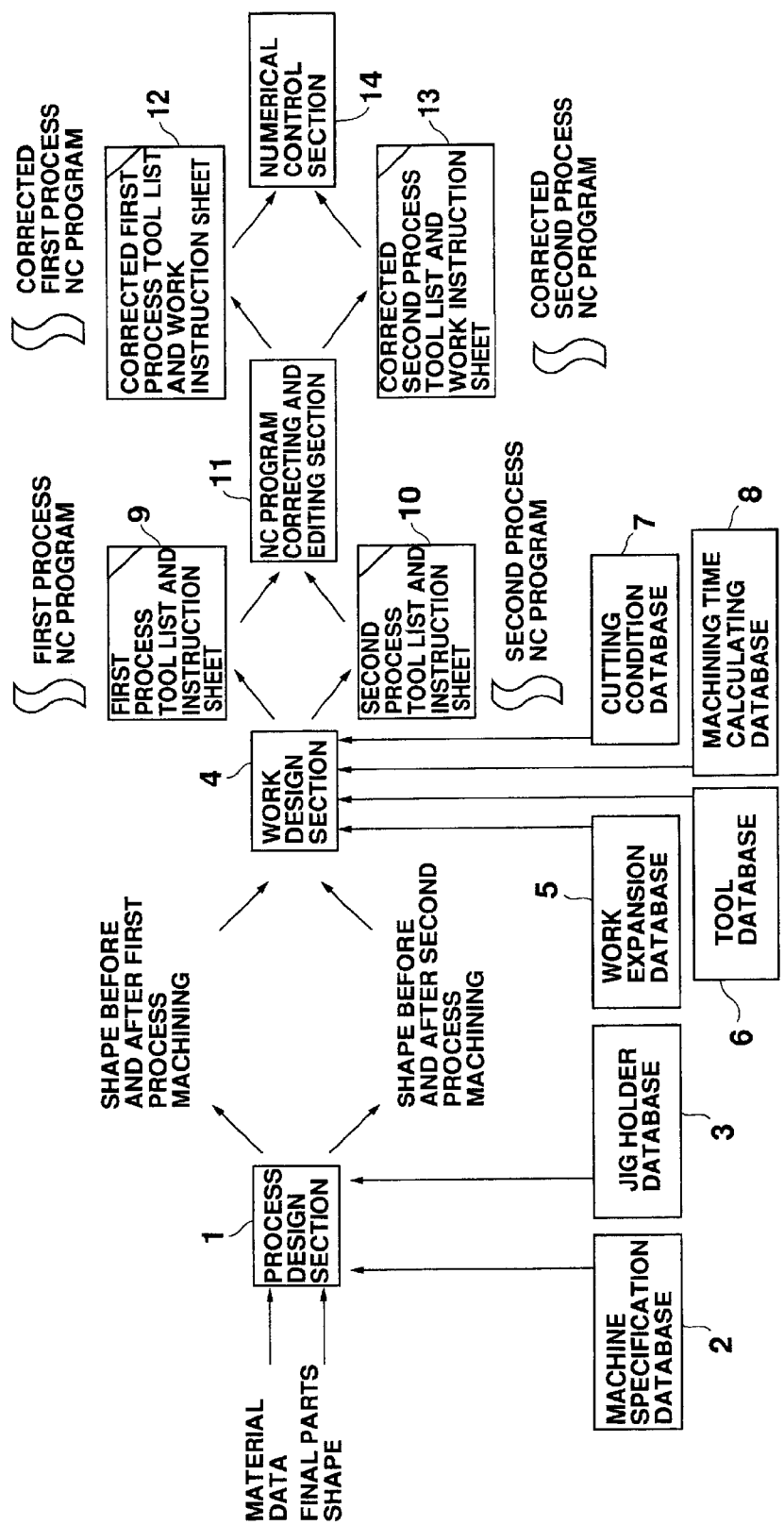
FIG. 1 is a view showing NC program forming procedures in a prior art.

The NC program formed as described above and a tool list are sent to a numerical control device 25, then an necessary idle operation, a test cut, or a simulation is carried out, and the NC program is further corrected and edited as described in FIG. 1, thereby completing an actual machining NC program which can be used at an actual machining site by the numerical control device 25. The correcting and editing section of the NC program is not depicted in detail in FIG. 2.

The numerical control device 25 includes an NC program executing means 27, a servo control means 28, and an error correction means 29 for operating a machine tool 26. The NC program, the tool list and the material data are inputted to the NC program executing means 27. The NC program executing means 27 can interpolate on the basis of an appropriate feeding speed using the input data while referring to measured results described later, and supply a servo control signal to the servo control means 28, which in turn allows the feed operation of the machine tool 26 to be properly controlled by the output operation signal of the servo control means 28 in accordance with the NC program. The error correction means 29, provided for correcting a positional and/or dimensional error of the machine tool 26 due to temperature change, can correct an error or the like caused by temperature change using the output of a measuring instrument mounted on the machine tool 26.

Thus, the machine tool 26 performs desired work element machinings, machining step machinings, and a process machining on a workpiece 30 mounted on a table according to the NC program, completing the machining at a first position of the workpiece 30.

After the process machining at the first position of the workpiece 30 has been completed, a measuring instrument 31 measures the coordinates of the workpiece 30 in accordance with a measuring program of a measuring control device 32. The measured result is feedback to the NC program executing means 27 and a machining method analyzing means 34 via measured result analyzing means 33, and is also supplied to each of the databases 21, 22, 23, and 24 if necessary. As described above, it is possible to perform a desired numerically controlled machining on the workpiece 30 on the basis of the NC program formed. The position of the workpiece 30 is changed after the process machining at the first position is finished, and thereafter machinings according to the NC program are successively performed at a second position similar to the first position.

The characterized part of the present invention is that the content of the actual machining NC program executed by the numerical control device 25 is appropriately analyzed to abstract machining information such as machining know-how included in the actual machining NC program, and the abstracted machining information can be stored rewritably. In the present invention, the machining information is abstracted as machining conditions for each work element machining from the analyzed results of the NC program, and the machining conditions are stored in a storage means so as to correspond to each work element machining.

In FIG. 2, the machining program, the tool list and the measured results are supplied to the machining method analyzing means 34, which abstracts necessary machining information according to a predetermined algorithm as described later. Then, the abstracted machining information is supplied to a database forming means 35, where the machining information classified in each item are written and stored as machining conditions corresponding to each work element machining in the respective databases: the work expansion database 21, the cutting condition database 22, the tool database 23, and the machining history database 24.

Therefore, after the actual machining of the workpiece 30 is performed by the machine tool 26, each of the databases 21 to 24 can always obtain the machining information such as the know-how at a machining site reflecting the actual machining, and renew the content of the databases, and the content of the renewed databases can be reflected in the present machining, which allows the machining information to be given as the optimal databases when the next NC program is formed.

As described above, according to the NC machining system of the present invention, it is possible to obtain an excellent advantage as described in the following. The machining information such as the know-how at a machining site, which has been used only for correcting and editing the original NC program in the prior art, is analyzed and abstracted from the corrected actual machining NC program actually used for the machining site, and as a result the abstracted information can be instantaneously reflected in the databases. Therefore, it is possible for the NC program forming means to form an NC program which incorporates the latest know-how at the machining site at all times because of the reflection of the work information in the databases, remarkably simplifying the correcting and editing work from an original machining program to an actual machining program compared to the prior art.

In addition, such reflection of the machining information in the databases can be performed in a period in which several machining steps are done from the actual machining starts, thereby making it possible to apply to successive NC programs or a present NC program for re-adjusting.

Moreover, according to the present invention, each of databases including the reflected machining information can freely apply to any machine tool constituting a CIM. Of course, if the material or final parts shape is changed, it is possible to use a part of the databases relating to machine tools or tools as it is. Therefore, the databases will be usable for forming any numerical control information or for executing it, by opening such data to all terminal apparatuses constituting the CIM. Such excellent advantages of the present invention depend on the fact that the machining information is modularized as machining conditions for each work element machining in this embodiment, which allows the flexibility of the stored databases to be remarkably increased.

An example of an analyzing process of the NC program and an abstracting process of the machining information or the machining conditions at the machining method analyzing means 34 will next described in detail.

Figure 3:
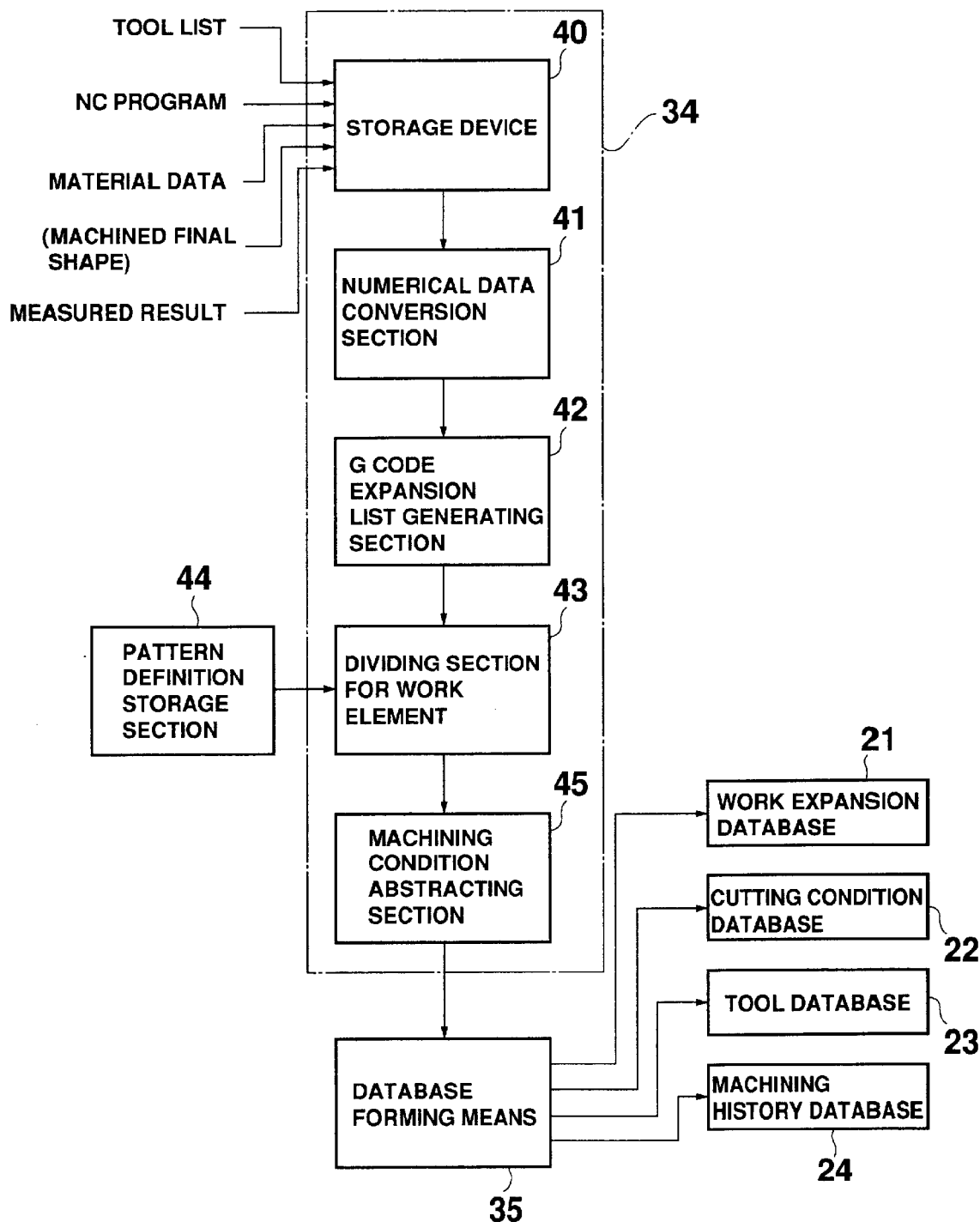
FIG. 3 is a block diagram of the principal parts of an NC machining system regarding the present invention in the system shown in FIG. 2.

FIG. 3 is a detailed block diagram of a program analyzing device according to the present invention in the numerical control system in FIG. 2. The actual machining NC program, the material data, and the tool list are inputted to the machining method analyzing means 34. If necessary, the final machining shape and measured result are also inputted.

In the machining method analyzing means 34, each input data is stored in a storage device 40, the actual machining NC program is analyzed per block and data-converted at a numerical data convert section 41, and each data is registered as a G code expansion list at a G code expansion list generating section 42. A program, which has a plurality of operations for one block such as a macro program or a subprogram, is registered in the G code expansion list, after being expanded to basic instructions in accordance with RS-274-D format. Such expansion to the G code is not always required in the present invention. However, in this embodiment, the data are expanded to the G code with which analyzing is facilitated, because the actual machining NC program is processed using a computer.

In the machining method analyzing means 34, the successive actual machining program is divided into respective work elements while referring to the G code expansion list at a dividing section 43. While the G code expansion program divided into respective work elements refers to a pattern definition stored in a pattern definition storage section 44, machining conditions for each work element are abstracted at a machining conditions abstracting section 45. The abstracted machining conditions for each work element is stored, via the database forming means 35, in the work expansion database 21, the cutting condition database 22, the tool database 23, and the machining history database 24 as above-described.

In general, the program division for each work element machining at the dividing section 43 is preferably performed while taking note of a sequence number (N number), tool dividing code (T code), tool replacement (M6), and optional stop (M01). Practically, in the program division for each work element, taking note of the tool replacement is done first, and while a tool is replaced a single tool is used, which can be regarded as an end of a work element. However, since a plurality of work element machinings may be performed with the same tool, for example, a plurality of prepared holes may be drilled with the same drill, it is preferable to read a tool locus pattern in addition to the tool replacement, thereby securely performing the program division for each work element machining.

The machining conditions abstracting section 45 abstracts necessary machining conditions from the program divided for each work element. In the present embodiment, when it is difficult to directly abstract the work conditions, the abstracting section 45 first recognizes the content of the work elements from the tool locus in the divided area and a work shape and forms a workpiece database as an intermediate database for each pattern list from the result of the recognition. For example, a drilling element list in the case of drilling is nominated as the above pattern list.

In the present embodiment, the above-mentioned machining conditions are written in each database for each work element machining. Generally, the machined material, the used tool, and each cutting condition are stored as the associated data for each work element machining. In this case, the cutting conditions are preferably stored as a cutting speed of each tool, and a feeding quantity per tooth or per rotation, not as a rotation speed or a feeding quantity of a tool which is usually used, allowing flexible modularized data to be formed, thereby making it possible to calculate a cutting condition of a tool having an approximate diameter from these basic data whenever required.

ONE EXAMPLE OF PROGRAM ANALYSIS

FIGS. 4A, 4B, and 4C shows one example of an actual machining NC program, with a program number 00001, used in the present embodiment.

Figure 5:
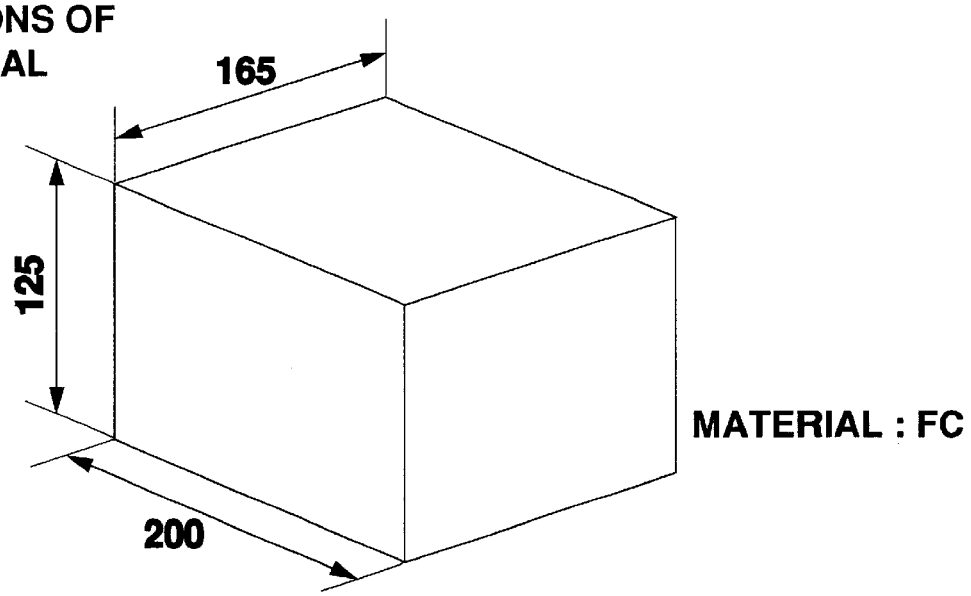
FIG. 5 is a view showing a shape of a material used in an embodiment of the present invention.
Figure 6:
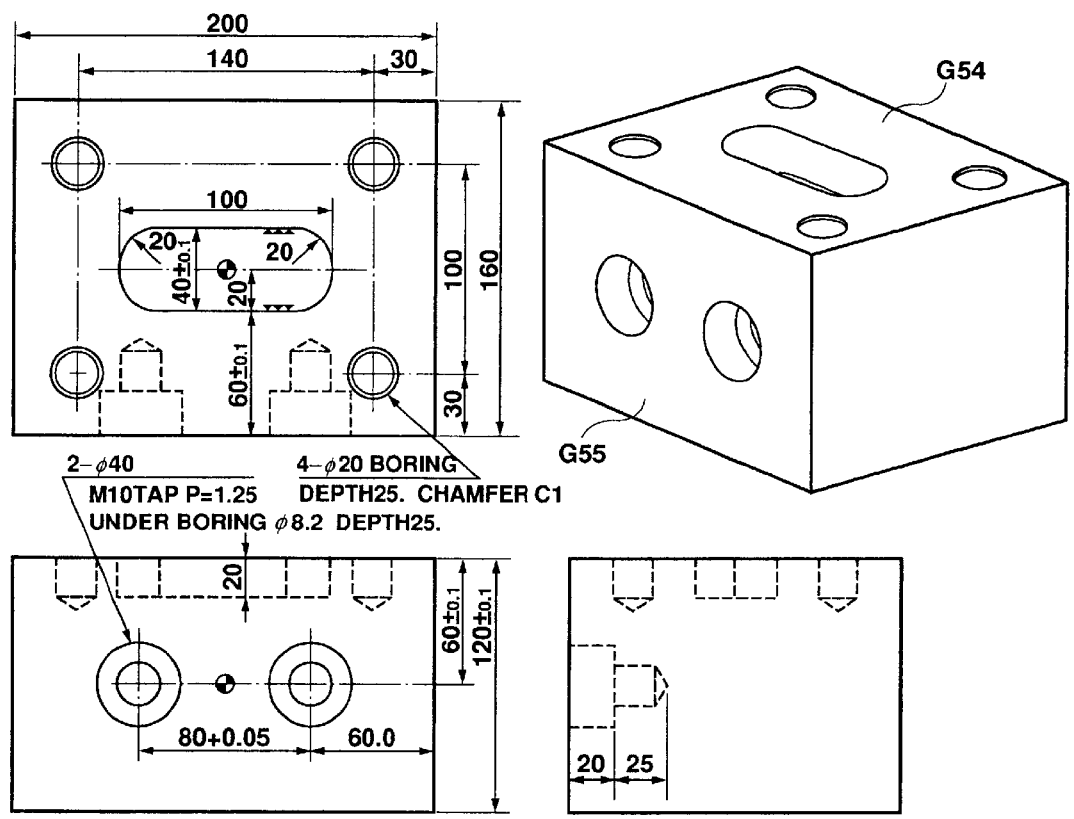
FIG. 6 is a view showing a machined final shape according to an embodiment of the present invention.

FIG. 5 shows a material shape machined by the actual machining NC program. FIG. 6 shows a machined final shape manufactured from the material shown in FIG. 5 by the actual machining program. The material data including a type of material and the machined final shape are supplied to the machining method analyzing means 34. As shown in FIG. 6, millings at the top face and the side faces, two drillings of the screw holes at the front face, four drillings with chamfers at the top face, and a slot machining are required as the machining processes.

For such machinings, the NC program forming means 20 determines a machining procedure, expands it into work elements, determines tools used for each work element, and determines a cutting condition for each tool.

FIG. 7 shows a tool list used in the program 00001, wherein each tool number is represented in T code and respective tool data are listed as shown, the tool list is supplied to the machining method analyzing means 34 as described above. In the machining method analyzing means 34, after the actual machining NC program is stored in the storage device 40, the stored data is transmitted via the numerical data converting section 41 to the G code expansion list generating section 42, where the data is converted to a G code expansion list with which computer analyzing is facilitated. FIGS. 8A, 8B, 8C, 8D, and 8E show a G code expansion list of the actual machining NC program 00001. The program shown in FIGS. 4A to 4C and the G code expansion list shown in FIG. 8. 8A to 8E are linked by the line numbers, and they have substantially the same content.

In the present embodiment, the actual NC program is classified into nine types; 1 to 9 of the sequence number N. The nine sequences are distinguished as processes each using a different tool. Of course, according to the present invention, a work element by which a different portion of the material is machined is recognized as a different work element even if the same tool is used. Thus, as described above, the program is divided into respective work elements on the basis of the machining locus pattern of a tool. However, for simplification of the explanation, the abstraction of the machining condition for each work element machining is described for the nine sequence numbers N.

ANALYSIS OF WORK ELEMENT IN N1

A command T1 is given in the line number 4, and a command M6 (tool replacement) is given in the line number 5, it is understood that a tool T1 is used for machining from the line number 7 until a next command M6 (tool replacement) is given. In the present embodiment, although a group of such programs is represented as the sequence number N1, it is apparent that such a sequence number has no meaning for a machine tool in the actual machining NC program.

It is understood that the tool T1 is a face mill with a diameter of 100 mm from T code 1 in the tool list shown in FIG. 7. The line number 7 designates a work coordinate system G54, in the present embodiment, which means the top face of the machined final shape shown in FIG. 6, defined as a machining of a first process.

In the line number 10, feeding for cutting is given the first time, wherein the cut face is a coordinate of Z0.1 (line number 9). A falling point of the face mill is set at (160, 50) in the X-Y coordinate system in the line number 7. It is understood from the line numbers 10 to 13 that the Z coordinate does not change and a moving axis alternately moves, for example, from X to Y to X to Y. By collating such a tool locus pattern with definition data stored in the pattern definition storage section 44, it is possible to judge a work element as a face machining step. An example of work elements and used tools for a machining step, and a pattern definition of a program analyzing method is shown in FIG. 9. The recognition of each work element machining is performed by using such pattern definition.

FIG. 10 shows an example of a work element list. In the present embodiment, machining conditions are formed as a variety of intermediate lists for each work element machining, and finally stored in the databases 21 to 24 shown in FIG. 3 as flexible modularized data. Of course, the list of the work elements shown in FIG. 10 is an example.

In the present invention, it is also preferable to define work elements which are obtained by dividing relatively large work elements shown in FIG. 10, and to form a machining condition database according to the work element defined for each step. The level of such definition of the work element can be freely defined in accordance with accuracy of a machine tool or a resolution of the entire machining system.

After the division for each work element machining has been performed, the result is stored as an intermediate work condition list. In the present embodiment, three types of list, a workpiece database, a machining pattern list database, and drilling element list, are prepared.

FIG. 11 shows an example of the workpiece database. A combination of work elements of the workpiece for each machining step, and tools used for each machining step are listed. Similarly, a workpiece file and a locus list file are produced for each work element. In FIG. 11, No. 1 and 2 show that face machinings are performed with two work elements, a rough milling and a finishing milling respectively, and a different tool is used for a different locus.

FIG. 12 shows machining pattern list data. Each machining pattern is classified as a face machining step, a pocket machining step, a core machining step, a slot machining step, or a drilling element, and each machining step consisting of work elements, and the depth of machining and the cutting method are recorded sequentially.

FIGS. 13 and 14 shows drilling element list. FIG. 13 shows it in analyzing order, and FIG. 14 shows it in the same hole order.

In the present embodiment, desired machining conditions for each work element machining are abstracted while analyzing each work element making use of the above-described three intermediate list databases, and the abstracted conditions are written in the intermediate databases.

As described above, since the work element of the sequence number N1 is judged as a face machining step, desired items are set to the face machining pattern list database from the result, and further required cutting conditions derived from the spindle rotation frequency and the feeding speed are written.

The program will be further analyzed for the sequence number N1. It is judged that the line numbers 15, 16, and 17 are finishing machinings, because the line numbers 10, 11, and 12 and the line numbers 15, 16, and 17 have the same locus with a different z coordinate and additionally there is no work element with the same tool later. Since the work element is a face machining step, the dimension of the material is converted into successive point elements, stored at a workpiece file AAA1 in the workpiece database (referring to FIG. 11), and stored as a face machining step in the workpiece database No. 1 and 2. Simultaneously, the line numbers 15, 16, and 17 are stored in a locus list file 1234, and associated with the workpiece database No. 1 and 2.

Next, the line numbers 19 to 30 are judged as a second process, since they indicate the work coordinate system G55, or a coordinate system for the front machining of the machined final shape shown in FIG. 6 in the present embodiment. It is judged that the line numbers 22, 23, and 24 are rough machinings, and the line numbers 27, 28, and 29 are finishing machinings, because the line numbers 22, 23, and 24 and the line numbers 27, 28, and 29 have the same locus with a different Z coordinate and additionally the difference in the Z coordinate is 0.1. Furthermore, a cutting area is judged as a face machining step since it covers the whole of the workpiece, and registered in the workpiece database similar to the first process.

As above mentioned, the sequence N involves a plurality of work elements, which are written in the intermediate databases according to the analysis, and further, machining conditions are written from these databases to the cutting condition database shown in FIG. 15. The cutting condition database is designated as reference numeral 22 in FIGS. 2 and 3. It is apparent from the drawings that the machining condition is stored so as to correspond to each work element machining. In this embodiment, the machining condition is such that a tool number indicates a used tool, a work material indicates the type of material, and a cutting speed of the tool, a feeding quantity per tooth (F1), a feeding quantity per rotation (F2), W (a cutting width per feed), and H (a cutting height per feed) are caused to be databases. Accordingly, by using the cutting condition database, an optimal selected tool for the type of the workpiece material and an optimal machining condition are stored for each work element. Thus, it is possible to select the optimal machining cutting speed, feeding, and cutting for each work element, if the type of workpiece or a tool is determined for each work element, which means that such modularized databases allow the optimal program to be directly selected when an NC machining program is formed, without requiring complicated correction and edition as in the prior art.

The reason for this is that the cutting condition database shown in FIG. 15 has already represented the optimal conditions in the specified circumstances after taking the machining site know-how, the simulation, and the test cut into consideration, which allows a machining condition in the same circumstances or conditions generated thereafter to be easily retrieved from such databases. Of course, it is actually difficult to prepare such a cutting condition database for all cases. However, according to the NC machining system of the present invention, data are successively accumulated in these databases, which is freely and flexibly usable not only for a single machine tool but also for all machine tools consisting of a CIM or another machine tool. Additionally, the amount of the accumulated data increases every time a new NC program is formed, and thus the databases grow continuously. Moreover, it is possible to easily reflect machining results obtained by another machine tool into an NC program even if the specified machine tool is in an idle state. Therefore, the NC machining system of the present embodiment has an advantage that it has an excellent growth and extendibility.

The cutting condition database shown in FIG. 15 of the present embodiment also stores a cutting time, a cutting distance, and a plurality of tip points, which are set as cutting edges, reflecting the measured results obtained from the measured result analyzing means 33, as well as the number of times the workpiece is contacted at five points 1 to 5 in the figure, a cutting start angle, and a cutting end angle, thereby obtaining an extended effect from such utilizing results of a tool.

Data of the utilizing results of a tool can be used for a tool database shown in FIG. 16 to reflect it. In the tool database 23 shown in FIGS. 2 and 3, a durable life value, an amount of wear, and a remainder of life can be written as shown in FIG. 16, and what wear history should be taken for specified utilizing results and a substantial durable life value for a tool can be stored, which in turn allows an NC program to be formed taking an optimal tool selection adopted when the NC program is formed, a tool replacement, and further a relationship between a final machined shape and a tool, etc. into consideration.

In the foregoing, the work element analysis of the sequence N1 and the abstraction of the work condition, the specified machining method, the abstraction, and the storage action into the databases according to the present embodiment have been described. Analysis of the work elements for the sequences N2 to N9 are next briefly explained.

ANALYSIS OF WORK ELEMENTS IN N2

The spindle tool will be T2 from the line number 31, transferring to work elements in N2. A tool T2 is recognized as a center drill with a diameter of 3 mm from the tool list shown in FIG. 7, resulting in the work elements in N2 being judged as drilling elements. Five work elements in a first process and two work elements in a second process mentioned later are intermediately stored in the drilling element list shown in FIGS. 13 and 14, the machining condition obtained is stored in the cutting condition database shown in FIG. 15 and the tool database shown in FIG. 16 so as to correspond to each work element machining.

FIRST PROCESS (G54)

coordinate 1 (70.000, 50.000) coordinate 2 (−70.000, 50.000)

coordinate 3 (−70.000, 50.000) coordinate 4 (70.000, −50.000)

coordinate 5 (30.000, 0.000).

SECOND PROCESS (G55)

coordinate 1 (40.000, 0.000) coordinate 2 (−40.000, 0.000)

ANALYSIS OF WORK ELEMENTS IN N3

The spindle tool will be T3 from the line number 47, transferring to work elements in N3. A tool T3 is recognized as a drill with a diameter of 20 mm from the tool list, resulting in the work elements in N3 being judged as drilling elements. Five work elements mentioned below are written in the drilling element list 19 and 20, and additionally stored in the cutting condition database and the tool database similar to the above-described sequence.

FIRST PROCESS (G54)

coordinate 1 (70.000, 50.000) coordinate 2 (−70.000, 50.000) coordinate 3 (−70.000, 50.000) coordinate 4 (70.000, −50.000)

ANALYSIS OF WORK ELEMENTS IN N4

The spindle tool will be T4 from the line number 57. A tool T4 is recognized as a drill with a diameter of 30 mm from the tool list, resulting in the work elements in N4 being judged as drilling elements. Three work elements mentioned below are set in the drilling element list, and stored in the cutting condition database and the tool database.

FIRST PROCESS (G54)

coordinate 1 (30.000, 0.000, −19.9)

SECOND PROCESS (G55)

coordinate 1 (40.000, 0.000, −21.0)

coordinate 2 (−40.000, 0.000, −21.0)

ANALYSIS OF WORK ELEMENTS IN N5

The spindle tool will be T5, or will be changed to an end mill with a diameter of 25 mm by the line number 68.

Generally, it is difficult to judge a type of work element only from a tool used, because there are many machining patterns corresponding to, for example, an end mill or a face mill. In the present embodiment, the judgment is performed by collating a tool machining locus with a machining pattern definition. Although some examples have already been shown for a face mill and a drill, an example of a corresponding relationship between the machining pattern definition and the machining steps is further shown in FIG. 17.

Returning to the work elements in the sequence N5, the line numbers 71 to 74 show the falling down to the machining face (Z-19.9) at the process 1 (G54) and coordinate 3 (30, 0), the line numbers 75 to 81 show the moving in the same plane, allowing a locus to be judged as a loop or closed because the coordinate (−50, 0) in the line number 75 and the coordinate (−50, 0) in the line number 80 are identical. The line numbers 5 to 80 are judged as the inside relative to the locus because a left side correction of G41 is performed in the line number 75. A locus shifted to inside by the radius of the tool relative to the locus is provided by G41, further a locus shifted by the radius of the tool relative to the locus is found. However, the locus has already been lost. It is judged from these tool loci that there are no cutting remnants in the inside when the tool moves from the line numbers 75 to 80, allowing it to be judged as pocket machining steps. This is a pattern when an end mill is used for the machining step pocket from the machining pattern definition shown in FIG. 17. Therefore it is possible to securely analyze a program making use of the pattern definition as FIG. 17, even for such a complicated program.

The movement in the line number 75 is judged as an approach, and the movement in the line number 81 is judged as a recess. An amount of the approach and an amount of the recess are stored in a pocket machining step pattern list shown in FIG. 12.

It moves above the work face in the line number 82, and is positioned at the coordinate (40, 0) of the second process (G55) in the line number 83. It moves in the same plane in the line numbers 86 to 88, moves through the circumferential locus in the line number 87, and is judged as the inside relative to the locus because a left side correction of G41 is performed for the locus in the line number 86. A locus shifted to the inside by the radius of the tool is found by G41, and further a locus shifted by the radius of the tool is found. However, the locus has already been lost by the judgment 1. Therefore it is judged that there are no cutting remnants in the inside, allowing it to be judged as pocket machining steps. Similarly, the line numbers 93 to 95 are judged as the pocket machining step. However, the center coordinate of the pocket machining step is judged as a drilling element from the conditions that it is pre-machined by the work element in the sequences N2 and N4 and the shape of the pocket is a circle. Thus, it is possible to recognize the work element for the sequence N5 making use of the machining pattern definition, and to reflect the defined machining conditions in the database as the machining condition involving know-how. In the present embodiment, while the machining conditions for each work element machining are stored in the cutting condition database shown in FIG. 15 and the tool database shown in FIG. 16, the above-described analyzed results are of course supplied to the work expansion database 21 and the machining history database 24 shown in FIGS. 2 and 3, and stored for each work element.

ANALYSIS OF WORK ELEMENTS IN N6

The spindle tool will be T6, or an end mill with a diameter of 25 mm from the line number 97.

The line numbers 105 to 108 show the movement in the same plane, allowing a shape to be judged as a loop because the coordinates in the line numbers 105 and 108 are identical. The locus and the tools are collated in the judgment 1. It is judged from the judged result that there are no cutting remnants in the inside, allowing it to be judged as pocket machining steps. Then, the locus can be judged as a finishing machining because it is identical to that in the sequence N5, and the machining of work element 1 in the sequence N5 can be judged as rough machining. Thereafter, the points in the line numbers 105 to 108 are judged as a finishing shape, stored in a workpiece file BBB1 (the workpiece database in FIG. 11), and stored at No. 5.6 in the workpiece database as a pocket work element.

ANALYSIS OF WORK ELEMENTS IN N7

The spindle tool will be T7 from the line number 111. A tool T7 is recognized as a drill with a diameter of 8.2 mm. Therefore, the sequence N7 is judged as a drilling element, and the following work elements are stored in the drilling element list.

FIRST PROCESS (G55)

coordinate 1 (40.000, 0.000)
coordinate 2 (−40.000, 0.000)

ANALYSIS OF WORK ELEMENTS IN N8

The spindle tool will be T8 from the line number 119. A tool T8 is recognized as a chamfer tool with a diameter of 25 mm. Since it is fixed by a drilling cycle of G81 until the Z axis rises in the line numbers 124 to 128, the work elements in N8 are judged as a drilling element, and the following work elements are stored in the drilling element list.

FIRST PROCESS (G54)

coordinate 1 (70.000, 50.000)
coordinate 2 (−70.000, 50.000)
coordinate 3 (−70.000, −50.000)
coordinate 4 (70.000, −50.000)

SECOND PROCESS (G55)

coordinate 1 (40.000, 0.000)
coordinate 2 (−40.000, 0.000)

ANALYSIS OF WORK ELEMENTS IN N9

The spindle tool will be T9 in the line number 134, replacing a tool with a M10 tap. Therefore, the sequence N9 is judged as a drilling element, and the following work elements are stored in the drilling element list.

FIRST PROCESS (G55)

coordinate 1 (40.000, 0.000)
coordinate 2 (−40.000, 0.000)

As described above, the actual NC machining program is sequentially analyzed, and the workpiece database (FIG. 11), the machining pattern list database (FIG. 12), and the drilling element list database (FIGS. 13 and 14) are formed as intermediate databases for each work element. Further, the cutting condition database (FIG. 15) and the tool database (FIG. 16) are formed on the basis of these intermediate databases, and similarly the machining conditions abstracted from the actual machining NC program are directly stored or memorized in the work expansion database 21 and the machining history database 24, which are not shown in detail.

Each of the above-described intermediate databases itself has necessary data, and these intermediate databases may be used as auxiliary databases for the NC program forming means 20 or, of course, as auxiliary storage means in the present invention.

In the present invention, the analyzing program may be formed as a recording medium, typically supplied as a floppy disk, a hard disk, ROM, or CD memory, etc., in which a machining method analyzing procedure and a database forming procedure are recorded.

EFFECTS OF THE INVENTION

As described above, according to the NC machining system of the present invention, machining methods are analyzed from an NC machining program used for an actual machining at a machining site to abstract a necessary machining condition. Further it is possible to reflect conditions in the database having data when the NC program is formed. Therefore, it is possible to form a database by securely abstracting the machining conditions including the correction and edition of the program obtained only from the machining site know-how, a test cut, or a simulation, which in turn allows a useful information database to be easily constituted.

According to the present invention, on the basis of numerical control information formed whenever machining is required, a material shape, a machined final shape, machining processes, tool information, and cutting condition are accumulated so as to be associated with the ability of a machine tool using the numerical control information, accuracy measuring data in machining, or a machining time, which in turn allows the machining conditions obtained by incorporating all of information such as know-how possessed by each of the numerical control information and various know-how obtained at a machining site to be formed into a database.

As a result, even when the former numerical control information changes, it is possible to automatically form a numerical control program which involves the optimal machining know-how by simple auto-programming, without clumsily utilizing the optimal machining know-how by a test cut or a simulation which is necessary for the prior part. Thus, it is possible to eliminate irregularities of the machining condition depending on the former numerical control information, which means that the machining can be efficiently performed with the optimal machining condition, allowing machining quality to be maintained or increased and allowing a machining time to be shortened.

Moreover, when a program formed for a specified machine tool is applied to another machine tool having a different machining ability, it is possible to automatically form a new numerical control program by individually using modularized machining conditions, while the difference of the machining ability between a machine tool for which a program is formed and a new improved machine tool is taken into consideration. For example, machining data accumulated by an old type machine tool is used as information for a new type machine tool, except for the changed points, and only new information about the changed points is added. Thus, even for automatic programming, it is possible to easily perform the optimal programming which reflects the data accumulated in the past.

As a result, it is possible to increase productivity throughout a factory.

Furthermore, the machining conditions for each work element machining used in an NC machining system with regard to the present invention can be used for machining by any other machine tool. Therefore, it is possible to obtain a continuously growing database by improving the overall machining efficiency using such machining information for the whole of a CIM and by sharing such a database.

What is claimed is:

1. An NC machining apparatus for performing NC machining controlled by an NC program, comprising:

machining method analyzing means, to which a machining NC program, material data and tool list are inputted, for extracting, from the machining NC program, at least one of a machining information and a machining condition for each work element machining by analyzing the machining NC program;

database forming means for converting the at least one machining information and the machining condition extracted for each work element machining into a database which is necessary to form the machining NC program; and an NC program forming database for storing, for each work element machining, the at least one machining condition and machining information extracted from the machining NC program for that work element machining so as to correspond to that work element machining.

2. An NC machining apparatus for performing NC machining, according to claim 1, wherein the NC program forming database contains at least a cutting condition database and a tool database.

3. A method for performing NC machining controlled by an NC program, comprising:

extracting, from an inputted machining NC program, inputted material data and an inputted tool list, at least one of a machining information and a machining condition for each work element machining; and storing, for each work element machining, the at least one machining condition and machining information extracted from the inputted machining NC program, inputted material data and an inputted tool list for that work element machining so as to correspond to that work element machining as a database which is necessary to form the NC program.

4. A system that builds a database of machining know-how information regarding NC machining work elements usable in a first NC program for NC machining, wherein the NC machining is controllable using the first NC program to form a first object, comprising:

extracting means for extracting from the first NC program, for each of at least one work element of the first NC program, at least one of machining information and machining condition information for that work element, wherein that work element is usable to create a corresponding feature in the first object; and storage means for storing, for each work element, the at least one of the machining condition information and the machining information in the database relative to that work element;

wherein, when the database stores at least one of the machining condition information and the machining information relative to a work element that is usable to create a desired feature in a second object by the NC machining, the at least one of the machining condition information and the machining information relative to that work element can be obtained from the database for inclusion in a second NC program for the second object.

5. A method of building a database of machining know-how information regarding NC machining work elements usable in a first NC program for NC machining, wherein the NC machining is controllable using the first NC program to form a first object, comprising:

extracting, for each of at least one work element of the first NC program, at least one of machining information and machining condition information for that work element from the first NC program, wherein that work element is usable to create a corresponding feature in the first object; and storing, for each work element, the at least one of the machining condition information and the machining information in the database relative to that work element;

wherein, when the database stores at least one of the machining condition information and the machining information relative to a work element that is usable to create a desired feature in a second object by the NC machining, the at least one of the machining condition information and the machining information relative to that work element can be obtained from the database for inclusion in a second NC program for the second object.

6. An apparatus for analyzing an NC program for NC machining, wherein the NC machining is controlled by the NC program, comprising:

machining method analyzing means, to which a machining NC program, material data and tool list are inputted, for extracting, from the machining NC program, at least one of a machining information and a machining condition for each work element machining by analyzing the machining NC program;

database forming means for converting the at least one machining information and the machining condition extracted for each work element machining into a database which is necessary to form the machining NC program; and an NC program forming database for storing, for each work element machining, the at least one machining condition and machining information extracted from the machining NC program for that work element machining so as to correspond to that work element machining.

\* \* \* \* \*